United States Patent [19]

Faroudja

[11] Patent Number: 4,918,515
[45] Date of Patent: Apr. 17, 1990

[54] COMPATIBLE TELEVISION TRANSMISSION SYSTEM WITH SEPARATE PREEMPHASIS PATH WITHIN SINGLE CHANNEL

[76] Inventor: Yves C. Faroudja, 26595 Anacapa Dr., Los Altos, Calif. 94022

[21] Appl. No.: 209,192

[22] Filed: Jun. 20, 1988

[51] Int. Cl.$^4$ ............................................. H04N 7/04
[52] U.S. Cl. ..................................... 358/11; 358/167; 358/141; 358/12
[58] Field of Search ................... 358/141, 133, 12, 11, 358/14, 16, 167, 166; 381/13

[56] References Cited

U.S. PATENT DOCUMENTS

3,846,719 11/1974 Dolby .
4,262,304 4/1981 Faroudja .
4,602,380 7/1986 Stebbings ............................. 381/13
4,731,660 3/1988 Faroudja et al. .

FOREIGN PATENT DOCUMENTS

0190085 9/1985 Japan ..................................... 358/12
0070891 4/1986 Japan .

OTHER PUBLICATIONS

Exploring and Exploiting Subchannels in the NTSC Spectrum, Dr. Michael A. Isnardi, David Sarnoff Research Center, Presented at 129th Society of Motion Picture and Television Engineers Technical Conference, 10/31/87.
NTSC—Full—Compatible Extended—Definition TV Proto Model and Motion Adaptive Processing, Takahiko Fukinuki, Yasuhiro Hirano and Hiroshi Yoshigi, Reprinted from IEEE Communications Society "IEEE Global Telecommunications Conference", Dec. 2, 1985.
An Extended Definition Television System Using Quadrature Moculation of the Video Carrier with Inverse Nyquist Filter, Yasumoto, Kageyama, Inouye, Uwabata, Abe, Wireless Research Laboratory, Matsushita Electrical Industrial Co., Ltd., IEEE Transactions on Consumer Electronics, Aug. 1987, vol. Ce—33, No. 3.

Primary Examiner—James J. Groody
Assistant Examiner—David E. Harvey
Attorney, Agent, or Firm—David B. Harrison

[57] ABSTRACT

A method for reducing noise and interference artifacts in a television system including a transmissiion end for transmitting a quadrature modulated color subcarrier television signal through a degrading medium and for display at a reception end, the method includes the transmission steps of: dividing the television signal into two paths, a main path and a preemphasis path, developing a main path television signal component in the main path, deriving a preemphasis component from the television signal in the preemphasis path in accordance with at least one predetermined preemphasis criterion, multiplexing the preemphasis component from the preemphasis path into a single spectrum including the main path television signal component, the single spectrum having a bandwidth substantially no greater than that required by the main path television signal without substantial intermixture of the preemphasis component and the main path television signal, and passing the single spectrum through the degrading medium; and comprising the reception steps of separating the single spectrum into a received main path television signal component and a received preemphasis component, combining the received main path television signal component and the received preemphasis component into a single television reception signal, deemphasizing the single television reception signal in accordance with an inverse of said predetermined preemphasis criterion, and putting out said deemphasized single television reception signal for display. In its preferred embodiment, the method remains downwardly compatible with existing television reception display devices while improving picture quality on displays equipped to process the hidden preemphasis component.

22 Claims, 20 Drawing Sheets

SMALL TRANSITIONS   LARGE TRANSITIONS

A

B

C

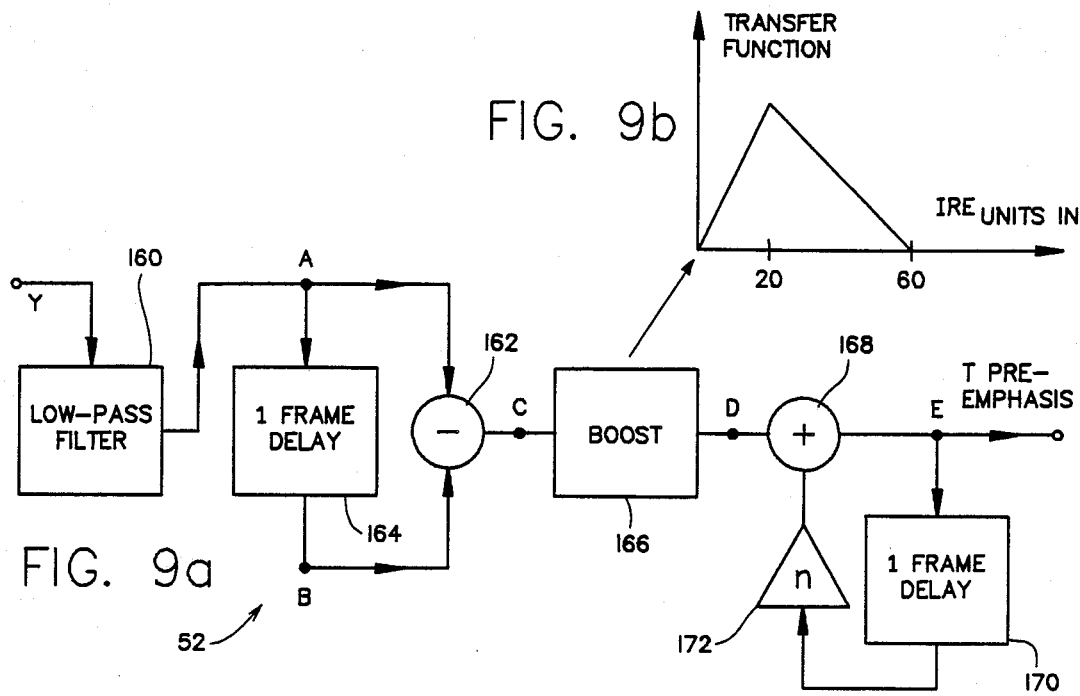
FIG. 9b
FIG. 9a
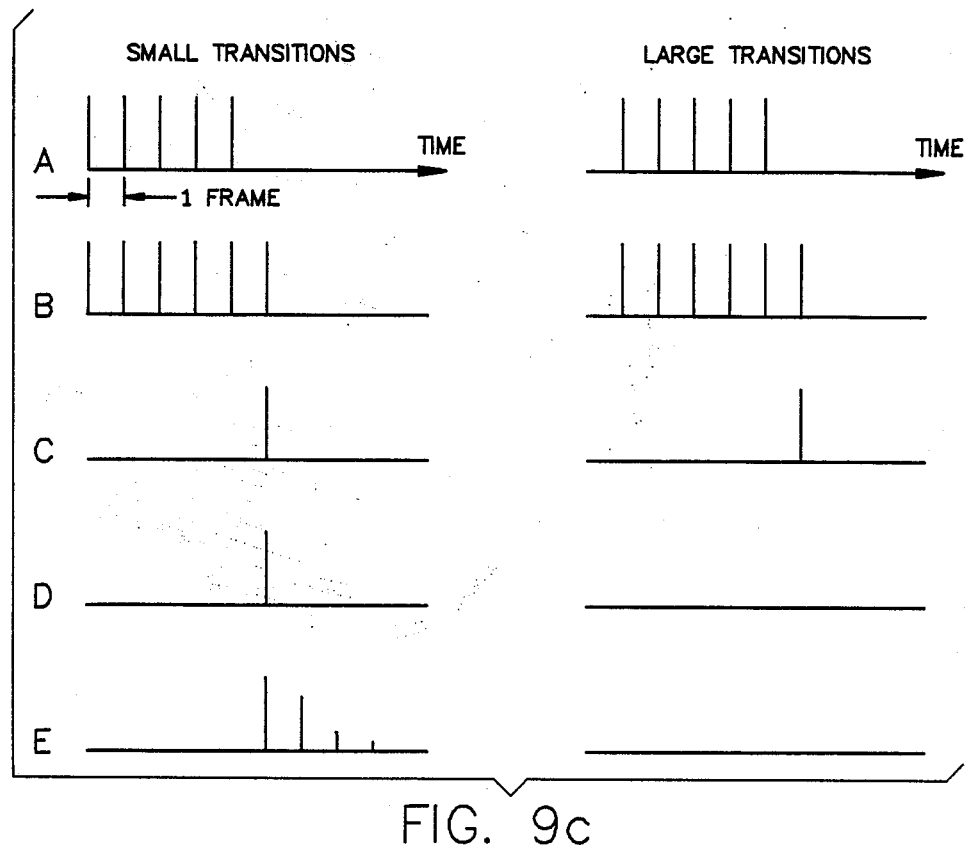
FIG. 9c

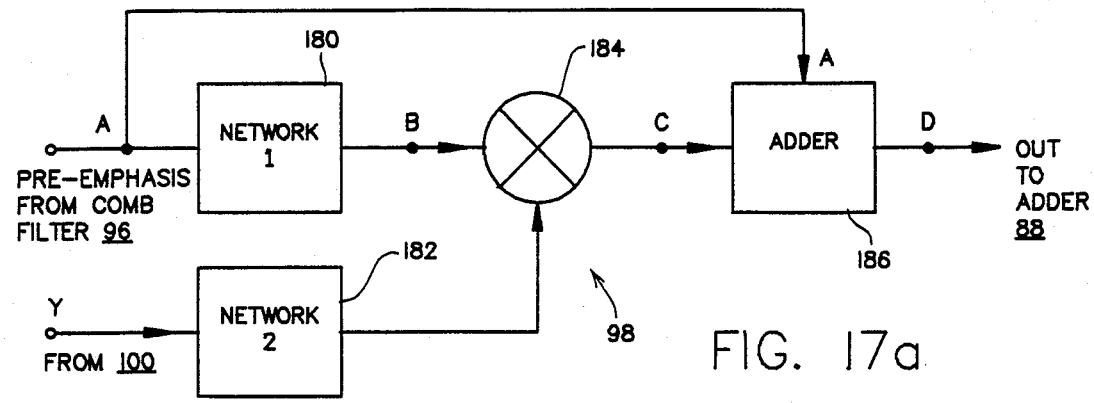
FIG. 17a
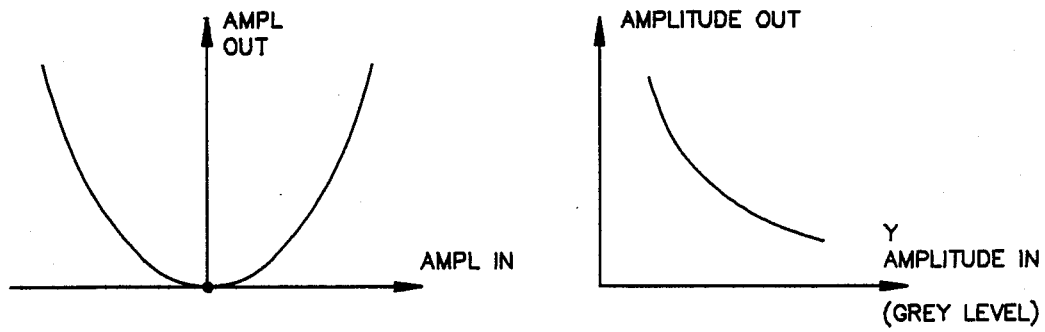
FIG. 17b
FIG. 17c
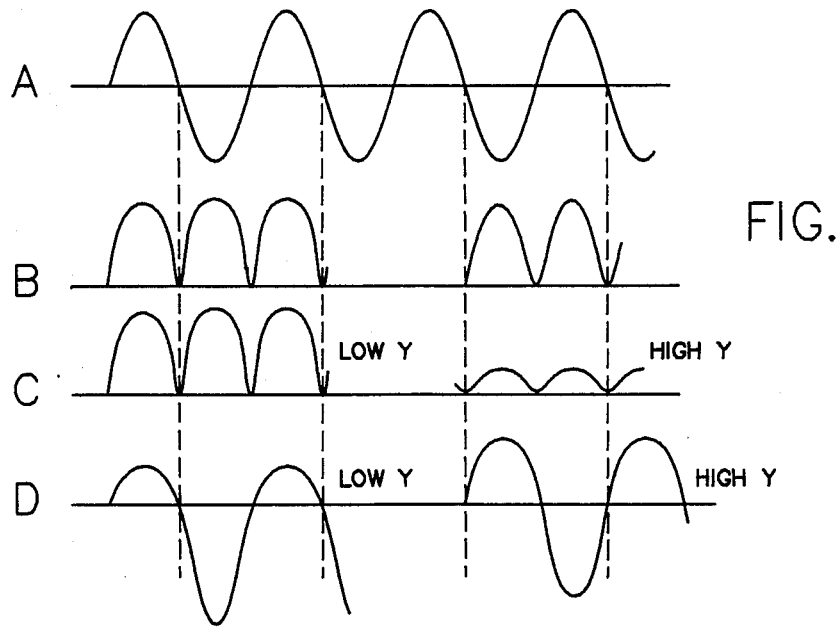
FIG. 17d

COMPATIBLE TELEVISION TRANSMISSION SYSTEM WITH SEPARATE PREEMPHASIS PATH WITHIN SINGLE CHANNEL

FIELD OF THE INVENTION

The present invention relates to television signal processing methods. More particularly, the present invention relates to television transmission systems using, in addition to the main path signal, a secondary path multiplexed within the main path for carrying preemphasis information to reduce transmission noise in the main path signal, while providing an overall original bandwidth signal spectrum which remains compatible with preexisting equipment designed to handle the conventional television spectrum.

BACKGROUND OF THE INVENTION

Conventional broadcast NTSC composite color subcarrier television signals nominally occupy assigned broadcast channels which are 6 MHz wide. The visual carrier frequency (amplitude modulation or "AM") is nominally 1.25 MHz above the lower boundary of the channel. The aural or sound carrier frequency (frequency modulation or "FM") is centered 4.5 MHz above the visual carrier frequency; and the chrominance subcarrier is 3.579545 MHz above the visual carrier frequency.

As is well known, since the color subcarrier frequency is an odd multiple of one half of the line scan rate, the sideband signals carrying the chrominance information exist as energy groups which are interleaved within the high frequency energy groups of luminance. When the chrominance and luminance energy groups overlap spectrally, the resultant picture display may be characterized by cross-color artifacts and cross luminance artifacts. Such artifacts may be noticeably reduced by comb filter encode and decode processing such as is taught in the present inventor's U.S. Pat. No. 4,731,660, the disclosure of which is hereby incorporated by reference.

Recently, with the advent of improvements in television picture display systems, workers in the art have proposed a wide variety of improved resolution television systems, one of which is known as "high definition television" or "HDTV", which proposes new transmission standards, typically 1125 scan lines, which are not immediately compatible with existing television receiving devices. Scan line doubling techniques, such as described in U.S. Pat. No. 4,719,644 are also known in the prior art as a way to increase virtual resolution.

One proposal for "compatible" high definition television is set forth in an article co-authored by Rzeszewski, Pazarci and LoCicero entitled "Compatible High-Definition Television Broadcast Systems" *IEEE Trans. on Broadcasting,* Dec. 1987 issue. That article sets forth systems using two standard, adjacent 6 MHz channels and which were capable of increased horizontal and vertical resolution, a wider aspect ratio and reduced cross-talk between the various components of the composite signal. In their proposal the luminance signal is given the benefit of over 7 MHz of bandwidth, which results in a much sharper picture image display.

The present inventor has discovered that increased resolution provided by two-channel television systems solves but one aspect of a multi-faceted problem. Most of the facets of this problem do not relate to present signal format limitations on resolution. Rather, most relate to unwanted noise and interference artifacts such as short term ringing and echo due to vestigial sideband filter group delay errors, and ghosts from multipath transmission phenomena.

More particularly, in cable television systems, the apparent defects of the NTSC format, such as cross-color, cross-luminance artifacts and lack of resolution are of less concern than the more pressing problems of adjacent channel interference, noise and short term ghosts and ringing (e.g. of 300–500 nanosecond duration) due to deficient line terminations associated with distribution amplifiers in local distribution loops. Therefore, the present inventor's pending application, Ser. No. 07/151,895, filed on Feb. 3, 1988 and entitled: "Wideband NTSC Compatible Transmission System with Noise Reduction Processing" proposes the use of a transmission system which uses two adjacent channels, not only to increase picture resolution but also to reduce noise and interference artifacts.

Thus, it is presently known to employ a 12 MHz spectrum for carrying a bandwidth increased, NTSC compatible, quadrature modulated color subcarrier signal which exhibits a better signal-to-noise ratio and protection against ghosts and interferences from other channels while obtaining resolutions approaching those obtainable with 35 millimeter format motion picture films. While the inventor's referenced wideband system is very useful for applications where bandwidth is not the issue (such as closed-circuit theatrical displays, or pay cable television services willing to offer the highest in technical picture quality), there are many situations where the use of spectrum allotted to two channels for transmission of but a single television program is not practical.

Over-the-air transmission is clearly limited to the number of available channels within the alloted radio frequency spectrum Even most present cable systems have a reasonably small number of channels available. Further, bandwidths of recording devices (video tape recorders, video discs) are limted by the characteristics and bandwidth restraints of the recording media.

Workers in the art have proposed NTSC compatible, single channel systems providing increased quality television picture signals. One such proposal is reported in an article co-authored by T. Fukinuki and Y. Hirano entitled "Extended Definition TV Fully Compatible with Existing Standards", *IEEE Trans. on Communications,* Vol. COM-32, No. 8, PP. 948–953, (Aug. 1984). Another proposal is reported in an article coauthored by Y. Yasumoto, S. Kageyama, S. Inouye, H. Uwebata and Y. Abe entitled "An Extended Definition Television System Using Quadrature Modulation of the Video Carrier with Inverse Nyquist Filter", *IEEE Trans. on Consumer Electronics,* Vol. CE-33, No. 3, pp. 173–180 (Aug. 1987). One more proposal is the subject of a paper presented by Dr. Michael Isnardi entitled "Exploring and Exploiting Subchannels in the NTSC Spectrum" at the 129th SMPTI Technical Conference, Oct. 31–Nov. 4, 1987, at Los Angeles, California. All of these proposals have related to multiplexing higher definition or wider picture aspect ratio information into the existing 6 MHz spectrum; and, they do not address the specific problems of transmission noise and unwanted artifacts which are very significant contributors to picture degradation.

The present inventor in his U.S. Pat. No. 4,262,304 described a low/level signal booster for television transitions which added an adaptively pre-emphasized noise reduction boost signal to a main path signal before the signal was subject to degradation by virtue of passage through a bandwidth degrading medium, such as a video recorder or noisy transmission path. Another prolific worker in the field, Ray Milton Dolby proposed in his U.S. Pat. No. 3,846,719 that a pre-emphasis/noise reduction signal be carried on a separate path or recording track parallel with the main video path or track.

Yet, despite these prior efforts a hitherto unsolved need has existed for a single channel (6 MHz bandwidth) television transmission system which contains pre-emphasized noise reduction information for reducing noise, interference and short term ringing and yet which remains fully compatible with the present NTSC signal format, so that television receivers of the prior art which are not equipped to process the noise reduction information are not deprived of their conventional functionality.

SUMMARY OF THE INVENTION WITH OBJECTS

A general object of the present invention is to provide a noise reduction television transmission and reception system which provides a separate preemphasis path which is multiplexed with an existing television spectrum in a manner which overcomes limitations and drawbacks of prior art television transmission and noise reduction approaches.

A specific object of the present invention is to either or both apply quadrature modulation and comb filter separation techniques to multiplexing and detection-separation of a separate preemphasis component of a television signal in order to reduce noise and other artifacts added to the signal by virtue of its passage through a degrading medium.

Another specific object of the present invention is to conceal a distinct preemphasis component within the spectrum of a conventional television signal so that a conventional television receiver and display is not degraded by the presence of the preemphasis component, and so that a television receiver and display equipped to make use of the preemphasis component has a significantly improved picture in which noise and other artifacts added by passage through a degrading medium are significantly reduced.

A method in accordance with the principles of the present invention is provided for reducing noise and interference artifacts in a television system including a transmission end for transmitting a quadrature modulated color subcarrier television signal through a degrading medium and for display at a reception end.

The method comprises the transmission steps of: dividing the television signal into two paths, a main path and a preemphasis path, developing a main path television signal component in the main path, deriving a preemphasis component from the television signal in the preemphasis path in accordance with at least one predetermined preemphasis criterion, multiplexing the preemphasis component from the preemphasis path into a single spectrum including the main path television signal component, the single spectrum having a bandwidth substantially no greater than that required by the main path television signal without substantial intermixture of the preemphasis component and the main path television signal, and passing the single spectrum through the degrading medium.

The method comprises the reception steps of separating the single spectrum into a received main path television signal component and a received preemphasis component, combining the received main path television signal component and the received preemphasis component into a single television reception signal, deemphasizing the single television reception signal in accordance with an inverse of said predetermined preemphasis criterion and putting out said deemphasized single television reception signal for display.

In one aspect of the present invention, complementary preemphasis and deemphasis processes are carried out in the horizontal, vertical and temporal domains.

In another aspect of the present invention, a scan period inversion, such as field-to-field inversion, is provided in order to enable multiplexing of the preemphasis component into the luminance spectrum in a manner which enables a field based comb filter to extract the interleaved preemphasis component at a reception end.

In a further aspect of the present invention, the preemphasis component is modulated upon a suppressed carrier in quadrature with the television picture carrier for interleave among double sideband low frequency energy groups of luminance.

In one more aspect of the present invention, the preemphasis component is divided into two segments, a low frequency preemphasis segment which is modulated upon a suppressed carrier in quadrature with the television picture carrier modulation for interleave among the double sideband low frequency energy groups of luminance, and a high frequency preemphasis segment which is inverted on a scan period basis, such as field to field, to enable interleave with single sideband mid-band luminance and separation at the reception end by comb filter separation techniques.

In still one more aspect of the present invention, gamma precorrection is added to the high frequency preemphasis segment.

In yet another aspect of the present invention, main path luminance and chrominance are precombed in order to provide spectral space for each other and for the preemphasis component.

In a still further aspect of the present invention, separate comb filter structures are employed to separate chrominance, luminance and the preemphasis component at the reception end of the system.

In its preferred embodiment the method remains downwardly compatible with existing television reception display devices while providing considerably improved quality picture displays on display devices equipped to practice the herein described method.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 8A is a block diagram of circuit elements comprising vertical domain preemphasis circuitry of the FIG. 5 IF modulator system.

FIG. 8B is a graph of the transfer function of the boost circuit element depicted in FIG. 8A.

FIG. 9A is a block diagram of circuit elements comprising time domain preemphasis circuitry of the FIG. 5 IF modulator system.

FIG. 9B is a graph of the transfer function of the boost circuit element depicted in FIG. 9A.

FIG. 9C is a graph of waveforms for both low amplitude transitions and large amplitude transitions in the time domain as noted by the letters A, B, C, D and E in FIG. 9A.

FIG. 17A is a block diagram of a one-over-gamma precorrection circuit within the FIG. 5 IF modulator system.

FIG. 17B is a transfer characteristic graph for the Network 1 circuit element depicted in FIG. 17A.

FIG. 17C is a transfer characteristic graph for the Network 2 circuit element depicted in FIG. 17A.

FIG. 17D is a graph of waveforms for both high luminance amplitudes and low luminance amplitudes taken at the points A, B, C and D in FIG. 17A.

DETAILED DESCRIPTION OF PREFERRED EMBODIMENTS

Figure 1:
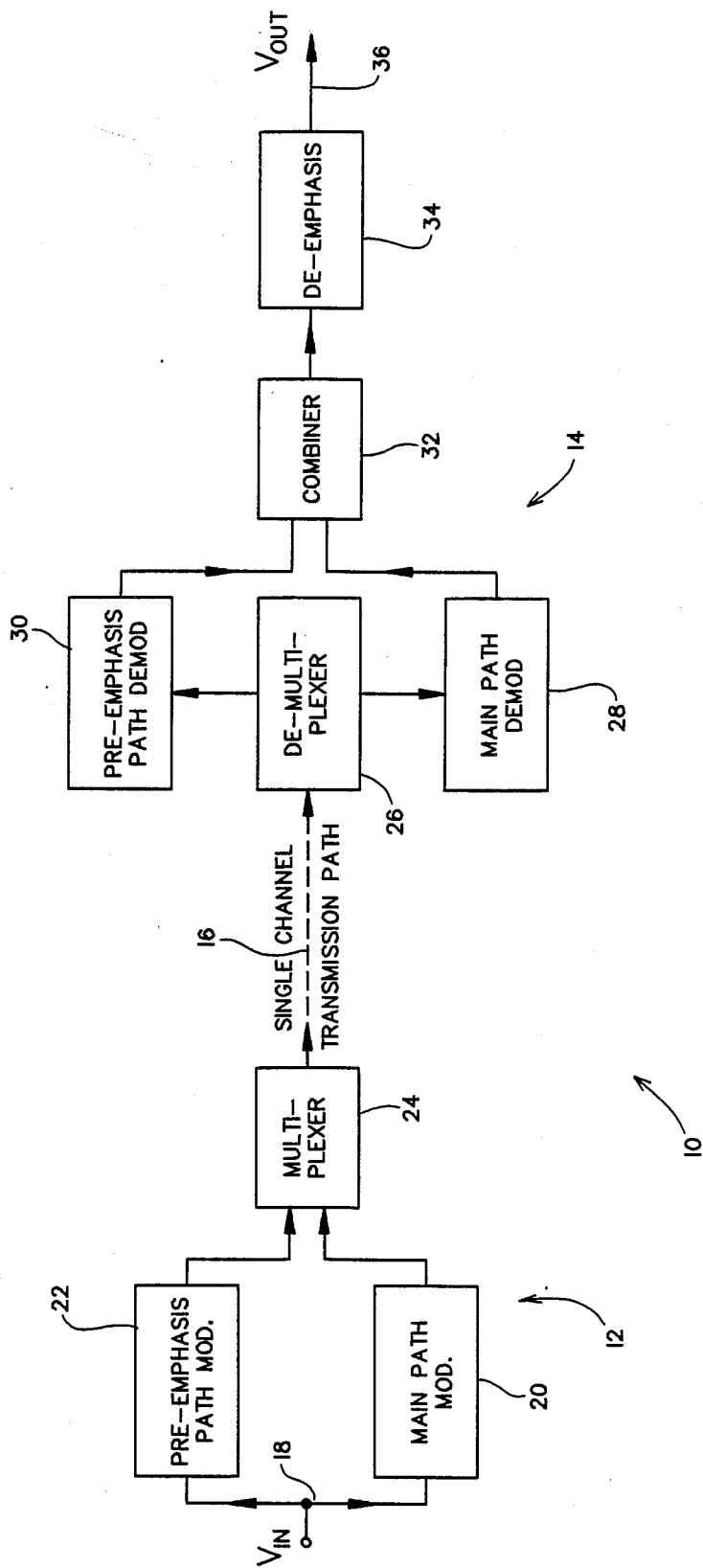
FIG. 1 is a block diagram of a single channel transmission system with preemphasis in accordance with the principles of the present invention.

A television system 10 depicted in FIG. 1 includes for example a transmission system 12, a reception system 14 and a single channel transmission path 16. Video enters the transmission system at an input 18 and is thereupon divided into two paths within the transmission system 12: a first or main path leading to a main path modulator 20, and a second or preemphasis path leading to a preemphasis path modulator 22. The modulated outputs of the main path modulator 20 and the preemphasis path modulator 22 then enter in proper time and phase delay match a multiplexer circuit 24 which causes the preemphasis path output to be interleaved into the spectrum already occupied in substantial part by the main path modulation output.

Thus, the signal put out by the multiplexer circuit 24 which includes both the main path modulation and the preemphasis path modulation occupies no more than the spectral bandwidth originally allocated for the main path modulation (it being understood that the multiplexed signal will have a slightly higher average energy content because of the presence of the interleaved preemphasis path modulation.

The output from the multiplexer 24 is then sent through a single path, such as an allocated television broadcast channel, or a channel provided by a cable television distribution system, or a medium such as the single video channel of a video recorder. The degrading medium is such that it adds unwanted information to the original signal content which may be random such as noise, or periodic, such as microreflections or ringing leading to "ghosts" in the reception end picture display.

At the reception system 14, a demultiplexer 26 separates the multiplexed preemphasis path signal component from the main path signal component. The main path signal component is then demodulated in a main path demodulator 28; and the preemphasis path signal component is then demodulated in a preemphasis path demodulator 30. The demodulated main path video and the demodulated preemphasis path signal are then combined in proper time and phase delay relation in a combiner circuit 32 to achieve a likeness of the original preemphasized signal put out by the multiplexer via the degrading path 16. Finally, the preemphasized likeness is deemphasized in a circuit 34 and put out at an output 36 as a very close representation of the original video presented at the video input 18 of the transmission system.

The techniques and circuitry hereinafter to be described are effective to reduce noise in a television system. They are also equally effective for reducing short term ringing and microreflections. Anything which is not present in the original signal and which is generated by, or a characteristic of, the transmission path or medium, is reduced by the deemphasis process. Echoes, ghosts and random noise artifacts have been observed to be reduced in appearance, although electrically the amplitudes of the detected echo and ghost signals are not reduced. They are deemphasized without concomitant preemphasis, and so their overall appearance is softer.

Transmission System 12

Figure 3:
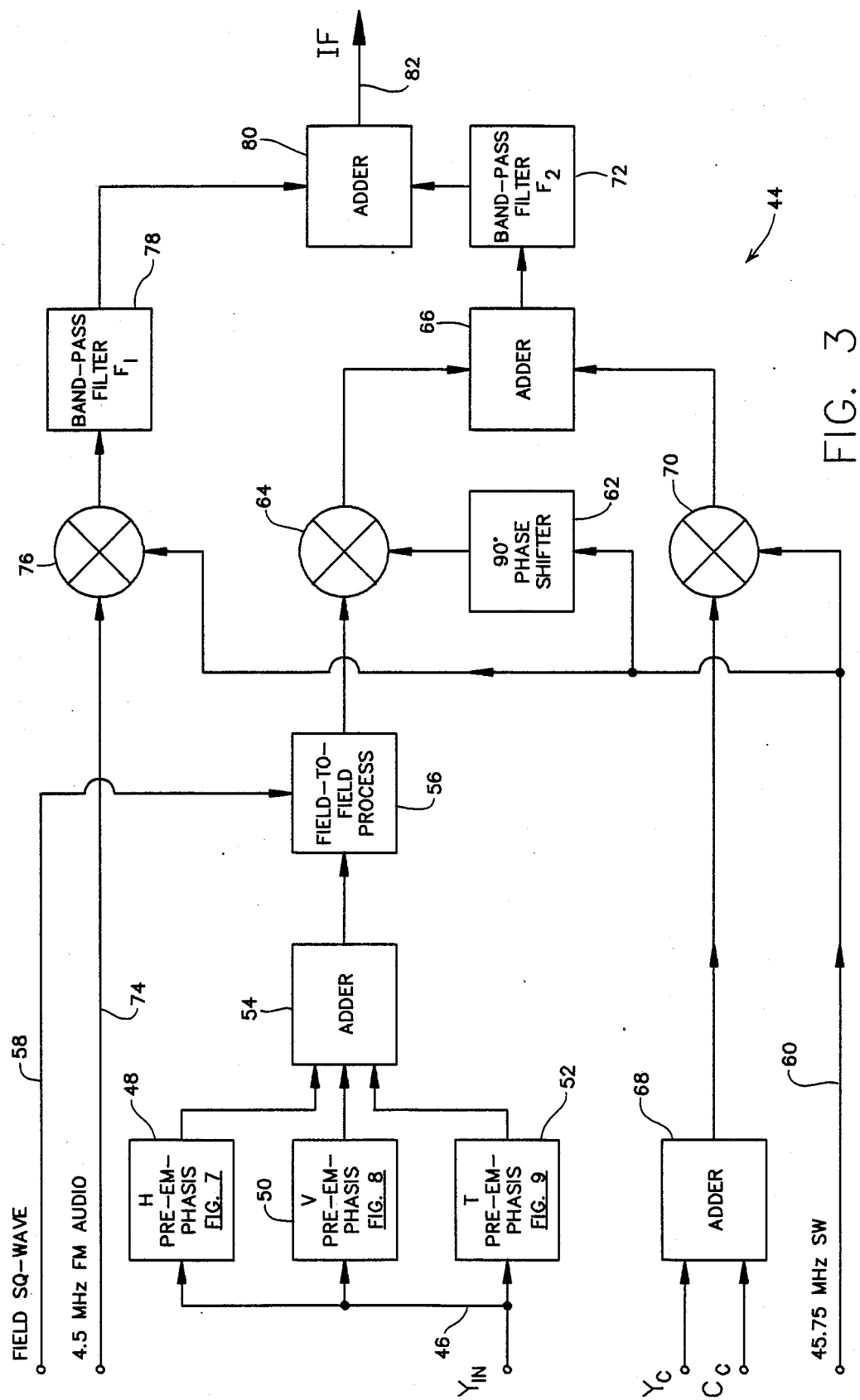
FIG. 3 is a block diagram of an IF modulator in accordance with the principles of the present invention.

One presently preferred form of frequency multiplexing which enables preexisting television receiving apparatus to be used without diminishment of functionality is depicted in the FIG. 3 graph of a single television intermediate frequency (IF) spectrum. This spectrum is illustrated as it is present common practice to carry out filtering and signal processing of television signals at an intermediate frequency, and then to hetrodyne-translate the resultant intermediate frequency to a final channel frequency where it is amplified linearly and broadcast, for example.

In FIG. 3 an IF carrier 38 marks the picture carrier frequency, and picture information is depicted as extending from approximately plus 1.25 MHz to minus 4.5 MHz relative to the IF picture carrier 38. A chroma subcarrier center frequency 40 is depicted as 3.579545 MHz below the IF carrier frequency as is conventional in the NTSC color signal format; and an FM audio subcarrier center frequency 42 is graphed 4.5 MHz below the IF carrier frequency. In accordance with conventional practice, the upper sideband of picture information modulation is removed by vestigial sideband filtering techniques above the plus 1.5 MHz cutoff region. So far, a conventional single television channel spectrum has been described.

Figure 4A:
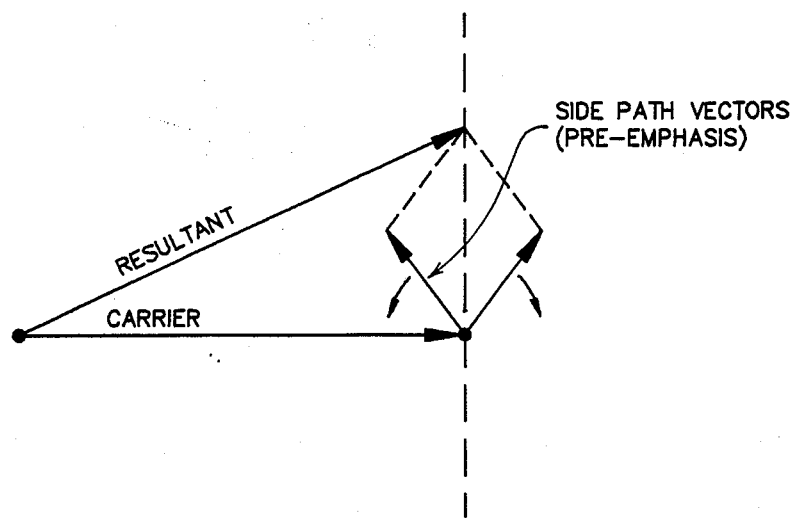
FIG. 4A is a vector graph of low preemphasis frequencies generated by the FIG. 3 IF modulator.

Into separate spectral portions of this spectrum two zones of preemphasis information are advantageously interleaved. In the symmetrical bandwidth extending plus and minus 1.5 MHz about the IF carrier frequency 38, quadrature modulated low frequency preemphasis information is inserted. This process is practical and downwardly compatible with existing prior art television receivers. As shown in FIG. 4A, if the side path preemphasis information vectors are in quadrature with the main picture carrier, the resultant vector of the sum of the carrier and the side path preemphasis information in quadrature won't be very different from the carrier vector, so long as the side path vectors are small. So, for compatability with existing prior art television receivers without introduction of noticeable new picture artifacts, the low frequency preemphasis information should be maintained within a range of 10 to 20 percent of the carrier amplitude.

Figure 4B:
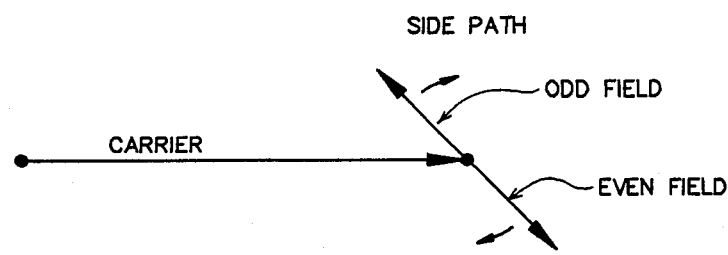
FIG. 4B is a vector graph of high preemphasis frequencies generated by the FIG. 3 IF modulator.

For preemphasis components which are higher than about one megahertz and are therefore further away from the IF carrier 38, quadrature modulation is not an available option because of the vestigial sideband filtering above plus/minus 1.5 MHz. Therefore, to reduce the visibility of preemphasis information in the one to two megahertz region, the phase of the preemphasis information is inverted on e.g. a field-to-field basis. Thus, this zone is represented as the side path vectors in FIG. 4B relative to the carrier vector. With a field-to-field phase inversion, the high frequency preemphasis information may easily be recovered by comb filter processing techniques.

Figure 2:
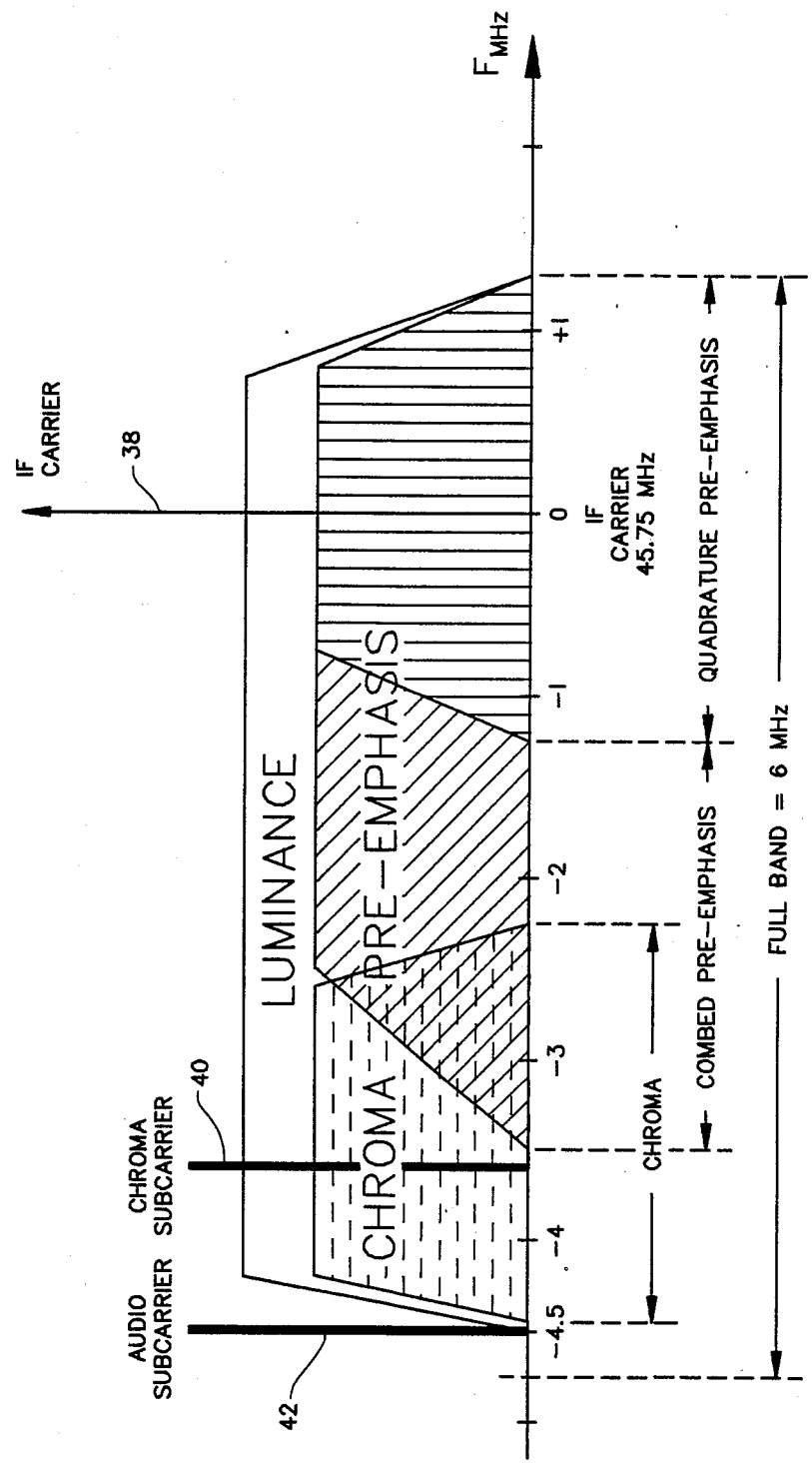
FIG. 2 is a graph of an intermediate frequency (IF) television channel spectrum generated e.g. by the FIG. 1 system in accordance with the principles of the present invention.
Figure 13A:
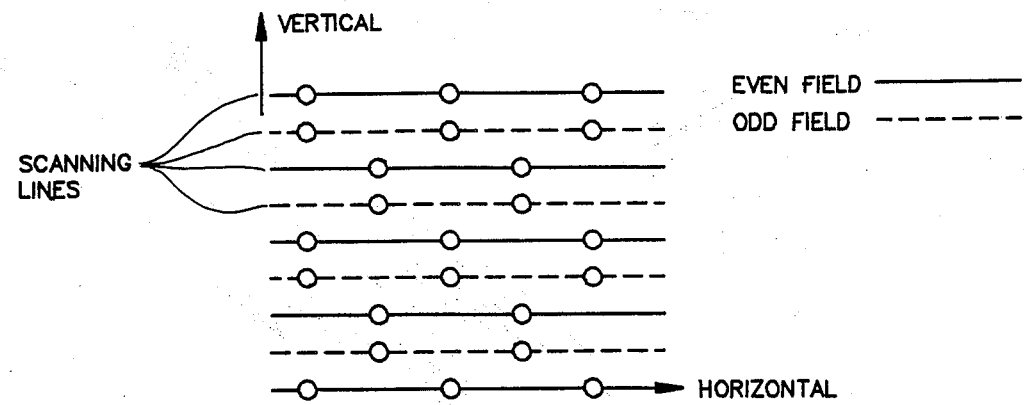
FIG. 13A is an enlarged, diagrammatic graph of a segment of television scan line picture elements illustrating appearance of chroma maxima in luminance if not filtered.
Figure 13B:
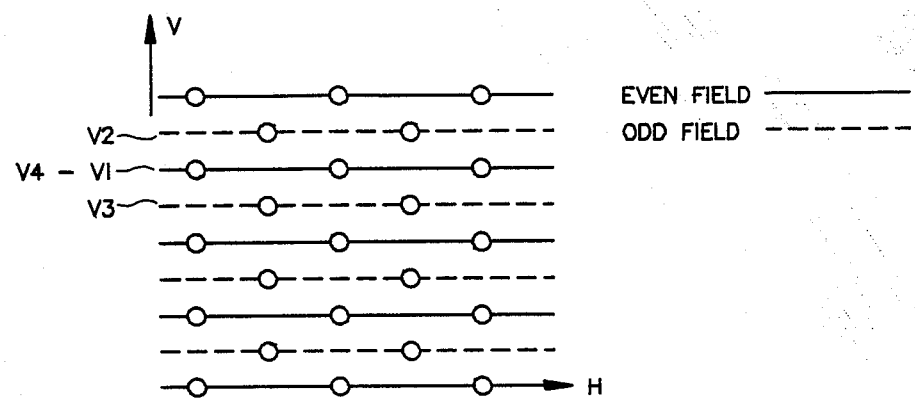
FIG. 13B is an enlarged, diagrammatic graph of a segment of television scan line picture elements illustrating appearance of chroma maxima in field inverted luminance if not filtered.

In FIGS. 13A and 13B a comparison is made in the display of the chrominance residue in the luminance path as it appears on a television receiver of the prior art (FIG. 13A) with the display of preemphasis components in the FIG. 2 high frequency preemphasis zone lying above about one megahertz (FIG. 13B). In the case of the chroma, two chroma maxima residues (cross-luminance) are vertically aligned relative to adjacent fields and are therefore more susceptible to visibility than are the high frequency preemphasis residues of the presently preferred embodiment of this invention which are spatially shifted and interleaved (diagonal) on a field to field basis. Thus, for conventional television reception, placement of phase alternating high frequency preemphasis information into the combed preemphasis zone depicted in FIG. 2 results in far less visible artifacts than result from the chroma maxima residues conventionally present in the luminance path of the conventional television set. In an amplitude range of 10 to 20 percent for preemphasis information, the eye averages the preemphasis artifacts, and they essentially disappear or do not appear on the conventional set in any noticeable or objectionable fashion.

Also, the chroma pattern repeats every two frames, so it flickers at a 15 Hz rate which may become visually objectionable. The present invention provides a high frequency preemphasis flicker rate at 30 Hz which is twice as fast as the flicker rate associated with chroma maxima information (cross-luminance artifacts); and is much less perceptible at the low preemphasis signal information levels included in the combed preemphasis zone in the FIG. 2 spectrum.

With the high frequency preemphasis information alternating in phase from field to field, it becomes interleaved with luminance and is very well suited to comb filter separation and processing by reference to luminance which usually stays constant from field to field. Also, the interleaved preemphasis information may be comb filter processed by reference to the chroma information by proper selection of field and line delays.

In order for the high frequency preemphasis signal components to cancel by integration of the eye, it is desirable to pre-gamma correct the high frequency preemphasis signal. As is well understood by those skilled in the art, the gamma characteristic is the non-linearity between light output of the cathode ray tube display and excitation voltage, as graphed in FIG. 14. Put another way, without pre-gamma correction, positive going peaks of light will not be cancelled by negative going peaks of light if both are created by equal exciting voltages. In order to achieve the same light levels, pre-gamma correction of a very small overall magnitude has been found to be very effective; while enabling an increase from 10 IRE units to 15 IRE units total amplitude for the high frequency preemphasis signal component (resulting in a 3 db overall signal to noise improvement) without any noticeable increase in visibility of the interleaved preemphasis component on the conventional television display.

FIG. 3 depicts one example of an IF modulator 44 for incorporation within the transmission system 12 of FIG. 1 and which achieves the spectrum illustrated in FIG. 2, for example. Luminance Y enters a preemphasis path input of the modulator 44 at an input 46 leading to three parallel-arranged preemphasis circuits: a horizontal preemphasis circuit 48 (FIG. 7), a vertical preemphasis circuit 50 (FIG. 8), and a time domain preemphasis circuit 52 (FIG. 9). The resultant low level (10 to 20 IRE unit) preemphasis signals put out by these circuits 48, 50 and 52 are combined in proper time and phase delay in an adder circuit 54 and are then subjected to phase alternation in a field to field phase reversal process in a field to field process circuit 56 operating under the control of a field phase switching signal present on a line 58. The result is a composite three dimensional preemphasis signal having a peak amplitude lying in the 10 to 20 IRE unit range.

A 45.75 MHz IF carrier switching signal enters the modulator 44 on a line 60 and passes through a 90 degree phase shifter circuit 62 to become quadrature modulated and thence to a modulator (four quadrant multiplier) 64 in which the field-to-field inverted preemphasis signal is carrier suppressed, double sideband modulated in quadrature relative to the IF carrier switching signal which provides an effective 6 db increase in noise reduction. The modulated preemphasis signal is then put out to an adder circuit 66.

Combed luminance and combed chrominance are combined in a main path adder circuit 68 and are conventionally modulated in a modulator 70 to provide quadrature modulated color subcarrier, double sideband color television picture signal modulation in accordance with the NTSC signal format. The resultant picture signal modulation is combined in the adder circuit 66 with the quadrature modulated preemphasis information from the modulator 64 in proper time and phase delay. Then, the resultant signal is subjected to vestigial sideband filtration in a bandpass filter 72 having the passband F2 depicted in FIG. 10.

Figure 10:
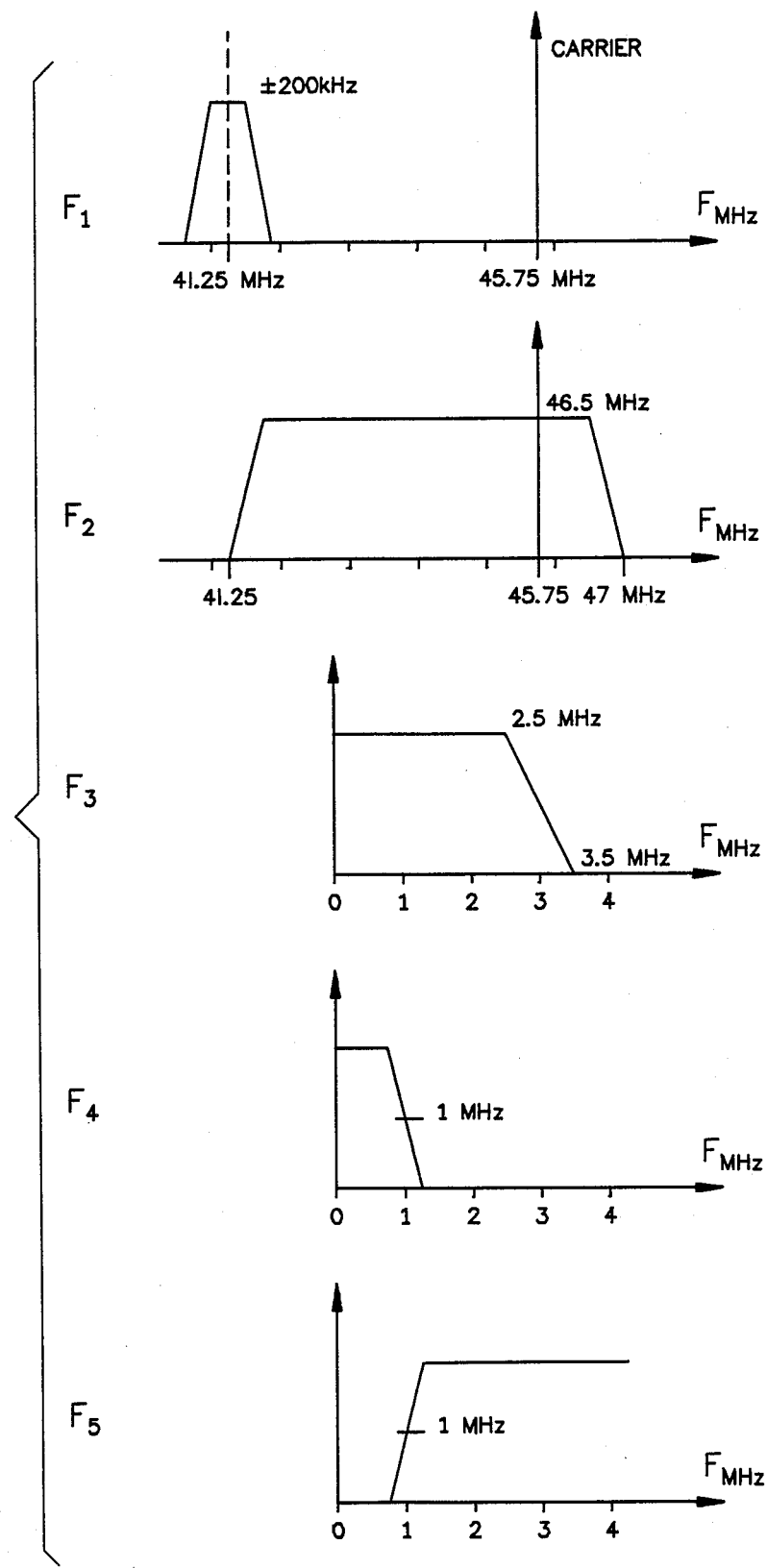
FIG. 10 comprises a series of graphs of passband transfer functions of five separate filter types F1, F2, F3 F4 and F5 included within circuitry embodying preferred embodiments of the present invention.

The FM audio subcarrier enters the modulator 44 on a line 74 and is modulated by the IF carrier signal on the line 60 within a conventional modulator circuit 76. The resultant modulation is then subjected to bandpass filtering in a filter 78 having the F1 bandpass characteristic as depicted in FIG. 10. Finally, the vestigial sideband filtered video modulation and the FM audio sound subcarrier modulation are combined in an adder circuit 80 and put out on a line 82. The signal put out on the line 82 follows the spectrum depicted in FIG. 2 and discussed hereinabove.

Figure 5:
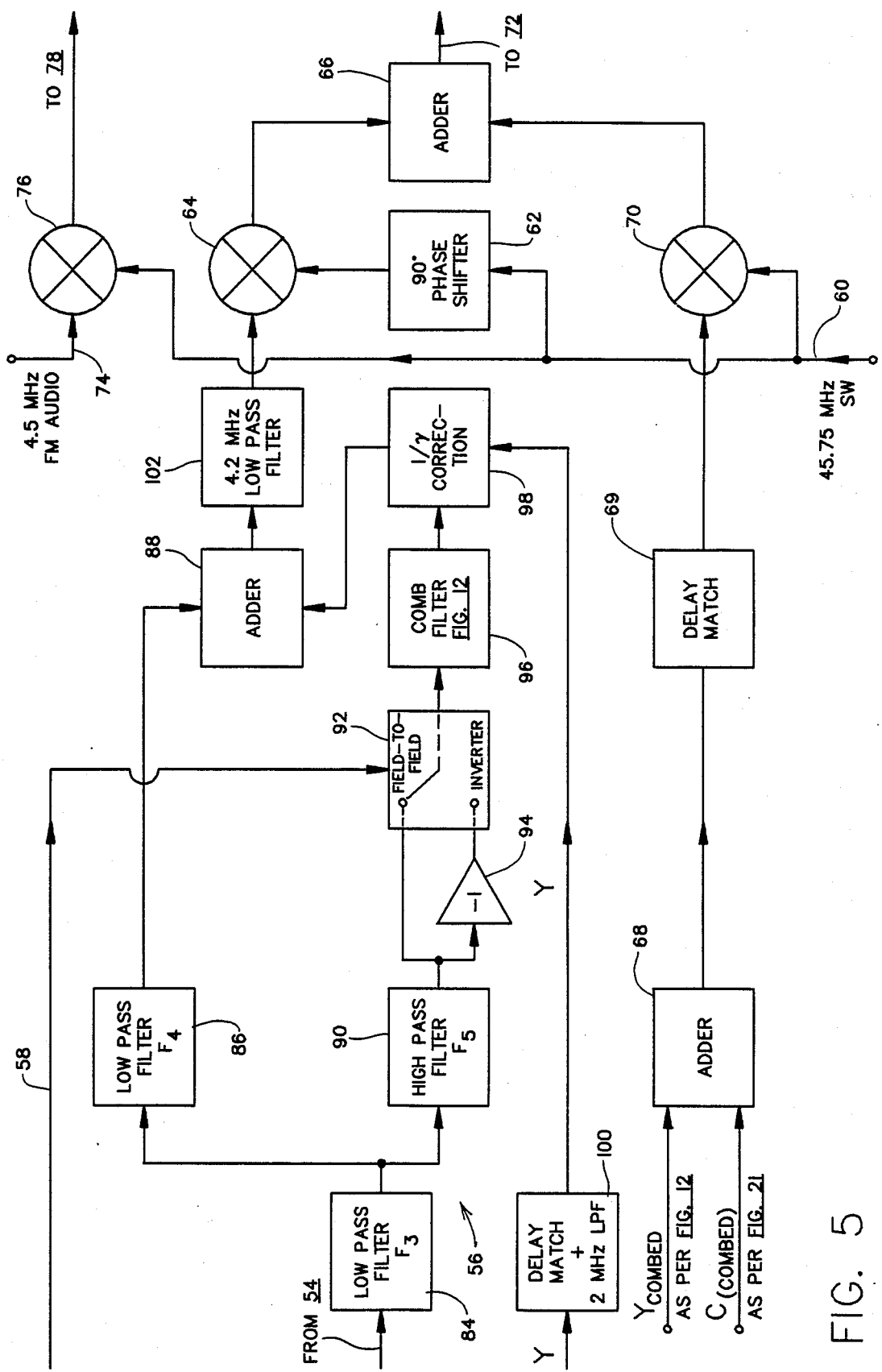
FIG. 5 is a more detailed block diagram of the FIG. 3 IF modulator.

FIG. 5 illustrates in greater structural detail one presently preferred embodiment of field to field process carried out within the circuit 56 of the FIG. 3 modulator. The other circuit elements already discussed in conjunction with FIG. 3 bear the same reference numerals in FIG. 5 and the prior discussion thereof will not be repeated in conjunction with FIG. 5.

In the FIG. 5 detailed block diagram, the three dimensional composite preemphasis signal put out by the adder 54 is passed through a low pass filter 84 having the F3 low pass characteristic depicted in FIG. 10 which begins a roll off of the preemphasis signal at around 2.5 MHz in order to prevent it from being superimposed with the interleaved chroma and create unnecessary chrominance flicker. A slight overlap with chroma information is desireable in the sense of increasing the bandwidth in which noise reduction is accomplished.

The low pass filtered preemphasis composite is divided into two paths: a first path through a low pass filter 86 having the F4 passband characteristic and thence to an adder circuit 88; and a second path through a high pass filter 90 having the F5 passband characteristic, thence directly to one pole of an electronic field to field inverter switch 92 operating under the control of the field square wave switching signal present on the line 58, and indirectly through an amplitude inverter amplifier circuit 94 to the other pole of the switch 92. The field to field inverted signal is then passed through a comb filter circuit 96 depicted structurally in FIG. 11; and is then passed through a gamma correction circuit 98 depicted structurally in FIG. 17A which operates from uncombed luminance taken from the input 46 via a delay match and 2 MHz low pass filter circuit 100. The signal put out by the gamma correction circuit 98 goes directly to the adder circuit 88, wherein the signals from both paths are recombined in proper time and phase delay relationship. The resultant preemphasis component signal is then subjected to low pass filtering by passage through a filter 102 having a very gentle 4.2 MHz upper cutoff frequency characteristic in order to eliminate high frequency harmonic residues from the one over gamma precorrection process carried out in the gamma correction circuit 98.

The low pass filter 86 has a passband characteristic which is complementary with the passband characteristic of the high pass filter 90.

The comb filter 96 is a significant circuit element in that its use in conjunction with properly delay matched (as by the circuit 69, for example) precombed luminance and chrominance in the main path assures that there will be room in the spectrum for the preemphasis component without energy overlap and resultant interference from the preemphasis component with the luminance and with the interleaved chroma. As already explained in conjunction with FIG. 13B, the preemphasis pixel residues are much closer spatially than results from comb filter processing of interleaved chroma, and the degradation of diagonal transitions for a given frequency is much smaller.

Figure 11:
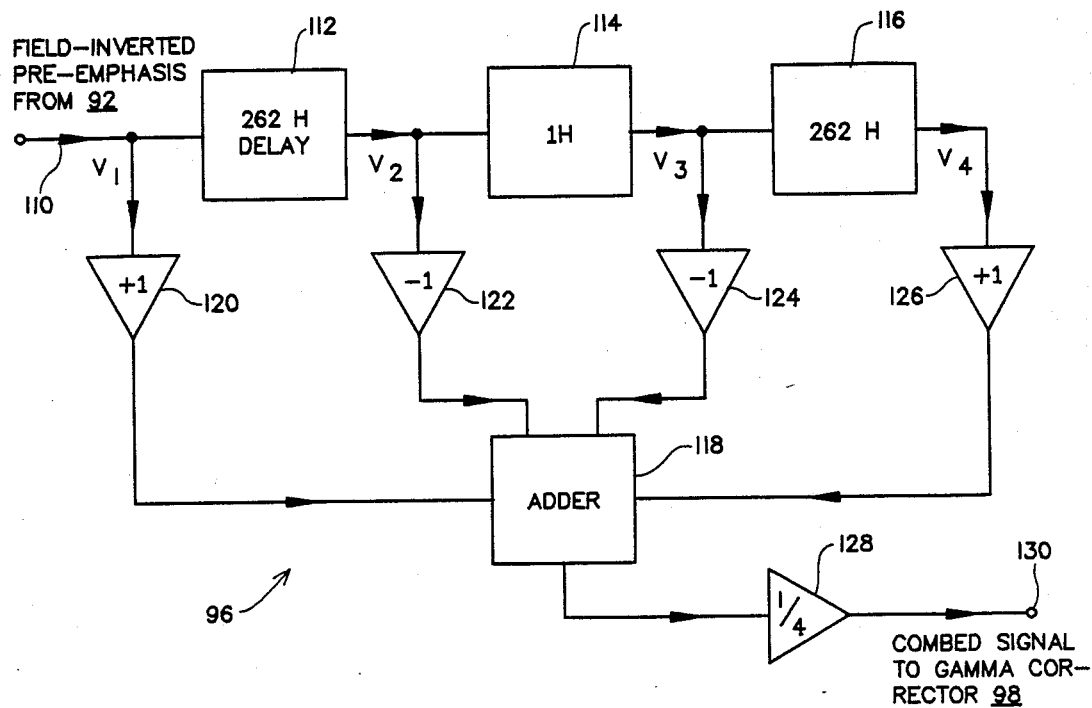
FIG. 11 is a block diagram of circuitry providing comb filter signal processing following field inversion of the FIG. 5 IF modulator system.

The structure of the comb filter 96 is set forth in greater structural detail in FIG. 11. Therein, an input 110 receives the field-inverted preemphasis component and passes this component through a series path including a first field delay 112, a one line delay 114 and a second field delay 116. Four signals V1, V2, V3 and V4, taken from nodes along this series path enter an adder circuit 118 after first passing through one of four unity gain amplifiers and/or amplifier/inverters. The first signal V1 is taken from the input and passes through a unity gain amplifier 120. The second signal V2 is taken from a node between the first field delay 112 and the one line delay 114 and passes through an inverting unity gain amplifier 122. The third signal V3 is taken from a node between the one line delay 114 and the second field delay 116 and passes through a unity gain amplifier 126. The fourth signal V4 is taken from the output of the second field delay 116. The four signals V1, V2, V3 and V4 arriving at the adder circuit 118 are combined and are then passed through a one/quarter of unity gain amplifier 128 to provide a combed preemphasis component on a line 130 extending to the gamma correction circuit 98.

Figure 13C:
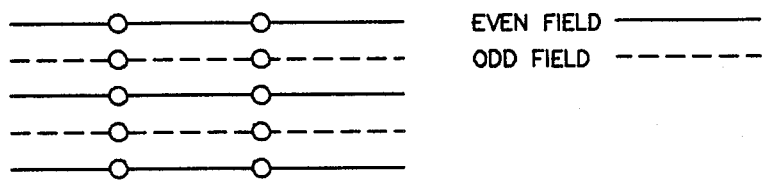
FIG. 13C is an enlarged, diagrammatic graph of a segment of television scan line picture elements illustrating appearance of vertically aligned luminance pixels.

Having in mind the structure of FIG. 11 and with reference to FIG. 13B, V1 (and V4 being one frame delayed from V1) are depicted e.g. as the third scan line of the FIG. 13B graph. V2 will be located earlier, apparently on the display, as it is delayed slightly less than V1 and V4. V3 is one line late, so it is apparently two scan lines after V2 after interleaving. If V3 and V2 are inverted and are added to V1 and V4 they will be in perfect phase and an average of these four signals is therefore put out by the adder circuit 118. Thus, the comb filter structure 96 is adapted to maximize and put out the preemphasis component. If chroma information were to be passed through the structure 96, the chroma would be phase cancelled and therefore cannot pass through it. If one considers luminance which can be graphed as a series of in-line vertical dots, as graphed in FIG. 13C, if two of the lines are inverted, luminance too is cancelled. Thus, the comb filter 96 is very effective for passing (i e. creating) the field-alternating combed high frequency preemphasis component (FIG. 2) and is simultaneously very effective to block luminance and chrominance information.

Figure 12:
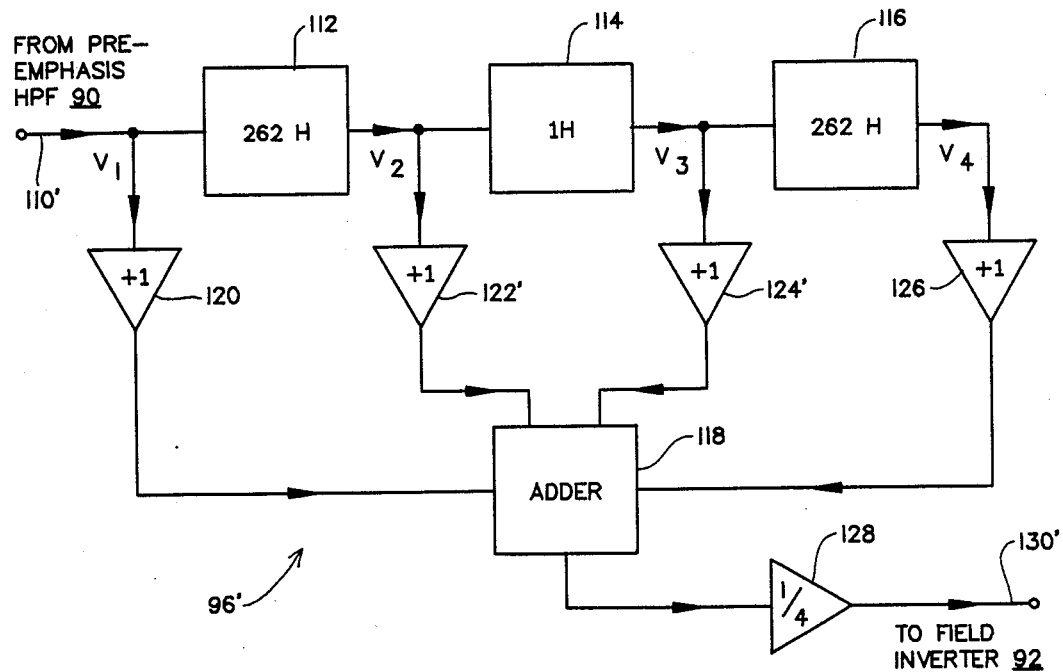
FIG. 12 is a block diagram of circuitry providing comb filter signal processing prior to field inversion in a modified form of the FIG. 5 modulator system.

While preferred, it is not essential to the successful operation of the IF modulator circuit shown in FIG. 5 that the comb filter 96 follow the inverter switch 92. A luminance comb filter 96' having the structure as depicted in FIG. 12 may replace the comb filter 96 depicted in FIG. 11, providing the comb filter 96, is inserted between the high pass filter 90 and the common node leading directly to one pole of the switch 92 and indirectly to the other pole thereof via the amplitude inverter 94. This structure 96, is identical with respect to the structure 96 depicted in FIG. 11, save for its input and output, and the unity gain amplifiers 122' and 124' which, in the FIG. 12 comb filter structure 96', replace the inverter amplifiers 122 and 124 present in the FIG. 11 comb filter 96. A similar explanation of operation applies to the structure 96' as has been given in connection with FIG. 13B and C with respect to the structure 96. The luminance comb filter 96' depicted in FIG. 12 is also used in the IF modulator to provide combed luminance which enters the adder circuit 68.

Figure 6A:
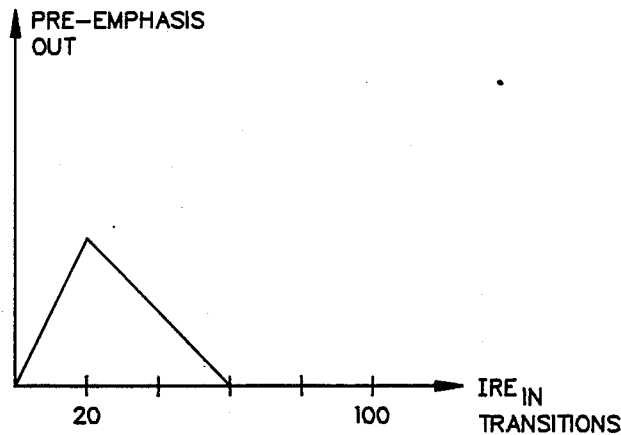
FIG. 6A is a graph of preemphasis versus transition amplitude level characteristic of the FIG. 5 IF modulator system in any one of the three dimensions of horizontal vertical and temporal.
Figure 6B:
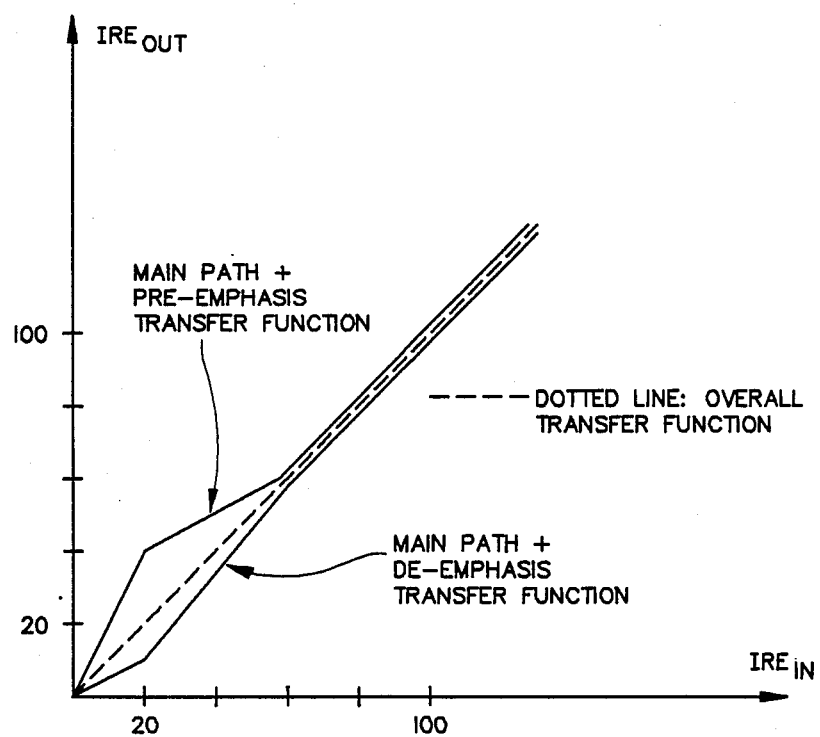
FIG. 6B is a graph of the preemphasis transfer function of the FIG. 5 IF modulator system in the three dimensions.

With respect to creation of the preemphasis component, FIG. 6A shows a preemphasis output level plotted as a function of incoming transition absolute amplitude. The curve peaks at 20 IRE units of incoming transition magnitude. The main path and preemphasis component transfer function; and the main path and deemphasis component transfer function, are both plotted against an overall idealized linear transmission system transfer function in FIG. 6B. This FIG. 6B graph applies in the horizontal, vertical and time domains.

Adaptive threshold techniques for noise reduction are discussed in some greater detail in the inventor's prior U.S. Pat. No. 4,262,304, incorporated by reference herein.

Figure 7A:
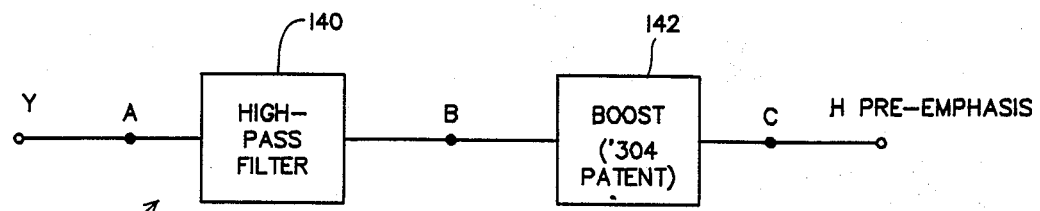
FIG. 7A is a block diagram of high pass filter and boost elements comprising horizontal domain preemphasis circuitry of the FIG. 5 IF modulator system.
Figure 7B:
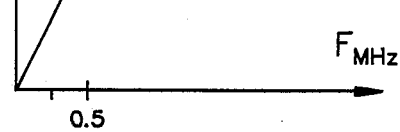
FIG. 7B is a graph of the transfer function of the high pass filter element depicted in FIG. 7A.
Figure 7C:
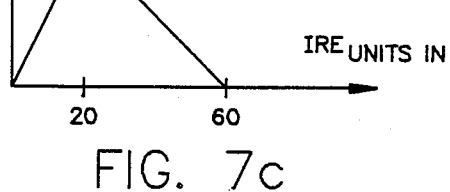
FIG. 7C is a graph of the transfer function of the boost element depicted in FIG. 7A.
Figure 7D:
FIG. 7D is a graph of waveforms for both low amplitude transitions and large amplitude transitions at the three points noted by the letters A, B, and C in FIG. 7A circuit.
Figure 7D:
Figure 7D:
Figure 7D:
Figure 7D:
Figure 7D:

With reference to FIG. 7A, the horizontal preemphasis circuit includes a high pass filter 140 and a boost circuit 142. The high pass filter circuit 140 is a more generalized statement than the second differentiator originally preferred in the referenced '304 patent, and it has the transfer characteristic set forth in FIG. 7B. The boost circuit 142 has the transfer characteristic set forth in FIG. 7C. For video transitions having small amplitudes, e.g. 20 IRE units, the response of the circuit 48 is as graphed in waveform C of FIG. 7D, left waveform. For video transitions having an amplitude above e.g. 60 IRE units, the response is as graphed in waveform C of FIG. 7D, right waveform.

With reference to FIG. 8A the vertical preemphasis circuit 50 is shown in greater circuit detail Luminance is low pass filtered in a filter 144 and then subtracted from one-line-delayed luminance in a subtractor circuit 146. A one-line delay 148 provides the line delayed video to the subtractor 146. This part of the circuit 50 operates similar to a vertical high pass filter and enables isolation of vertical transitions.

Figure 8C:
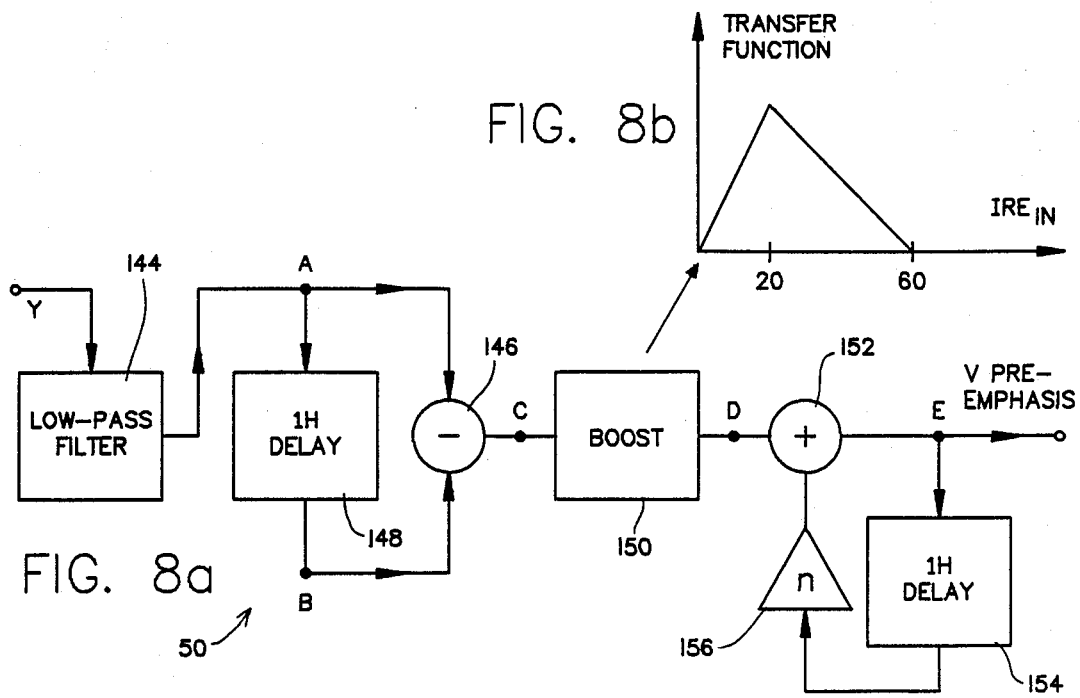
FIG. 8C is a graph of waveforms for both low amplitude transitions and large amplitude transitions in the vertical domain at the points noted by the letters A, B, C, D, and E in FIG. 8A.
Figure 8C:
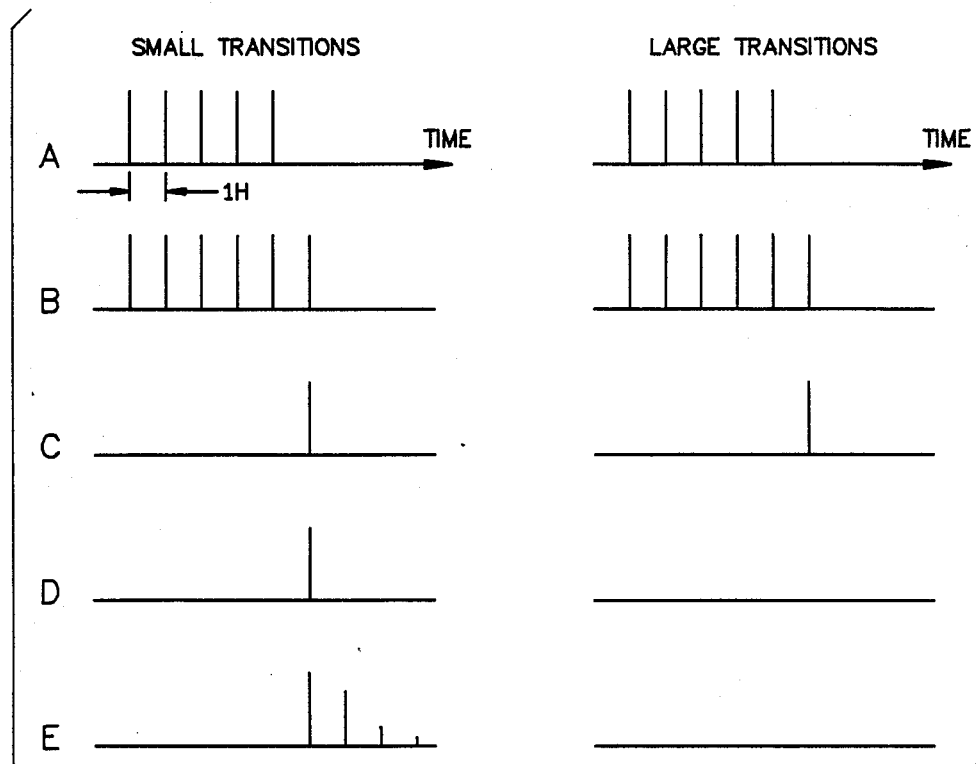

A boost circuit 150 enables elimination of very large transitions which are not to be boosted; and a recirculation circuit including a summing junction 152, one line delay 154 and amplifier having a fraction of unity gain n enables a low level single line vertical preemphasis component to be expanded over many lines as graphed in waveform E, left side of FIG. 8C.

The time domain preemphasis circuit 52 is shown structurally in FIG. 9A as being similar to the vertical preemphasis circuit, except that one frame delays replace the one line delays. Thus, incoming video passes through a low pass filter 160 to a subtractor 162. A first one frame delay 164 provides frame delayed video as the other input to the subtractor. The boost circuit 166 eliminates time domain transitions over a certain amplitude level, e.g. 60 IRE units, and a recirculation circuit comprising summing junction 168, second one frame delay circuit 170 and fraction-of-unity recirculation gain amplifier 172 spreads a single frame preemphasis component over a number of frames, as graphed in FIG. 9C, waveform E, left side.

Figure 14:
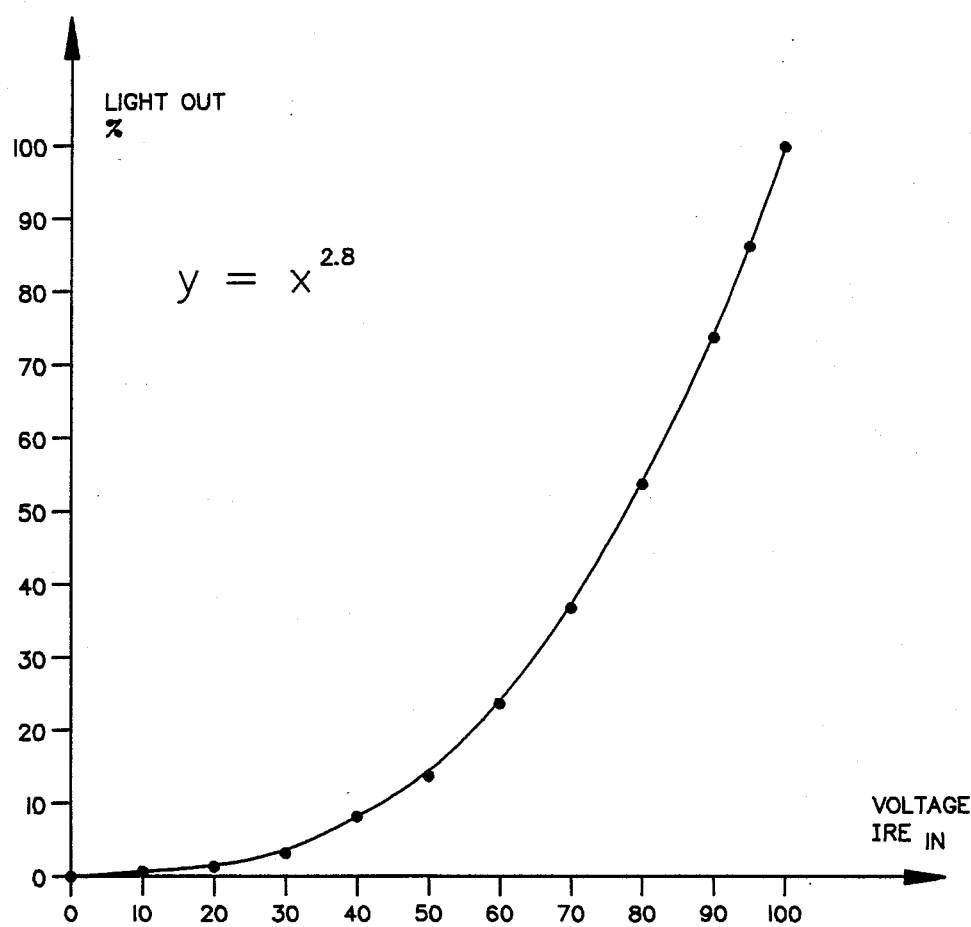
FIG. 14 is a graph of the effect of typical CRT gamma characteristics, with the excitation video voltage plotted against percentage of light put out by the tube.

The gamma characteristic of a typical cathode ray tube display is charted in FIG. 14. As can be readily seen, the intensity of light put out by the display is a non-linear function of excitation voltage. For low level signal transitions, e.g. at 20 IRE units maximum the light output will not vary linearly as the excitation signal transition proceeds from negative to positive in comparison to transitions from positive to negative. The video signal is always tending to go towards the white level (100 IRE units) whenever you add any component to the signal, including noise. For example, noise gives the resultant picture an appearance of greater clarity of picture detail, as more light is being added to the picture content by the noise.

Figure 15:
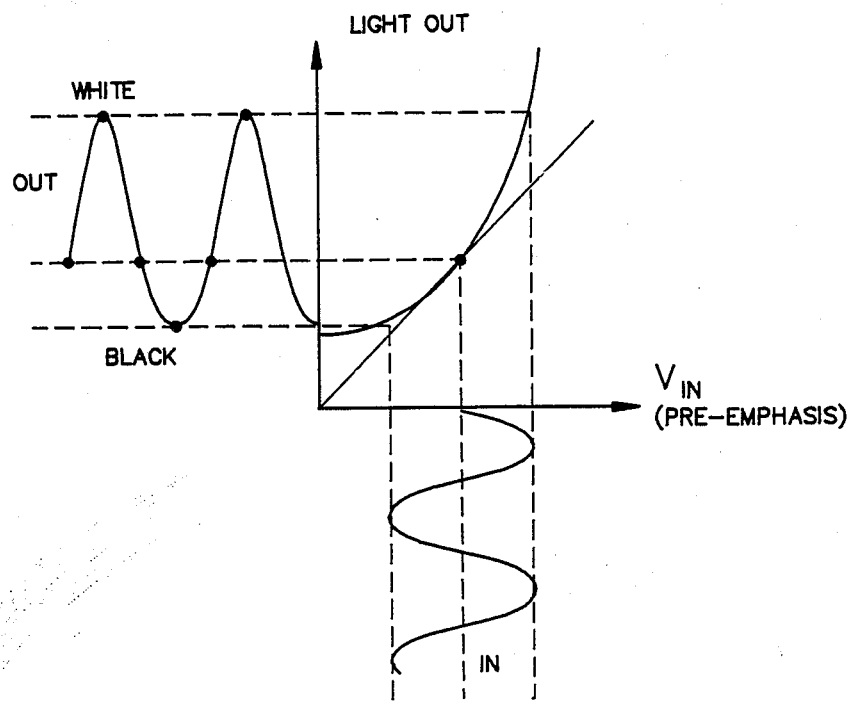
FIG. 15 is a graph illustrative of errors due to gamma characteristics in an uncorrected gamma operating environment.
Figure 16:
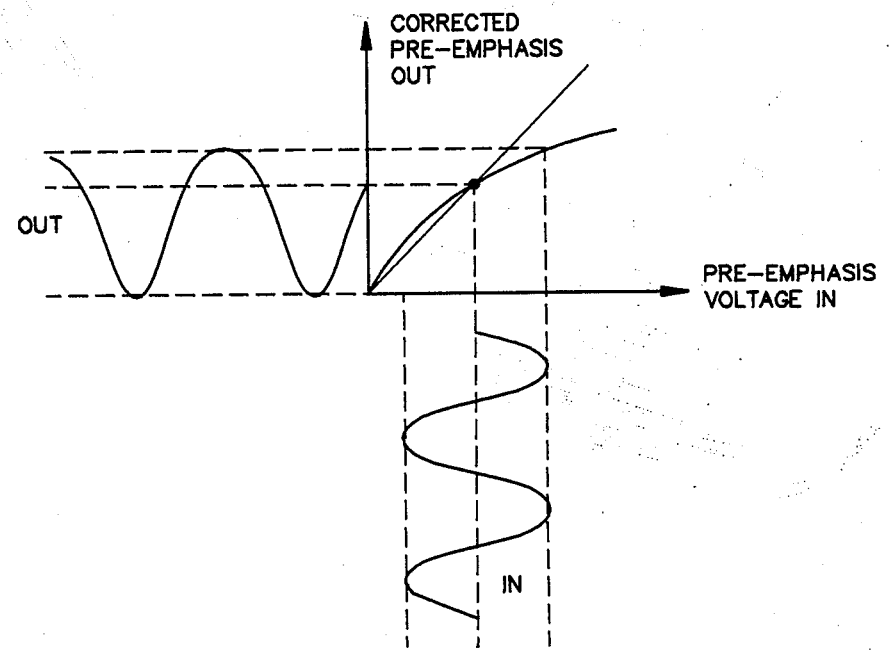
FIG. 16 is a graph illustrative of improved signal characteristics achieved by providing a one-over-gamma precorrection.

As can be seen in FIG. 15, excitation signal distortions due to the gamma characteristic of the picture tube display are concentrated in the white level area as opposed to the black level area. With gamma characteristic pre-correction of the preemphasis component as shown in FIG. 16, the distortion otherwise occurring from gamma is advantageously taken into account.

In order to perform an efficient gamma pre-correction, reference is made to luminance level as shown in FIG. 5. Greater detail of the gamma precorrection circuitry is set forth in FIG. 17A. Therein, the preemphasis component from the comb filter 96 enters a first network 180 which essentially acts as a soft rectifier having a transfer characteristic as graphed in FIG. 17B. Time and phase delay matched luminance enters a second network 182 is a gain controlled amplifier whose gain is controlled by the luminance signal, and it has a transfer characteristic set forth in FIG. 17C which shows that much more correction is applied to signal components at the black level than to signal components at the white level. The signals put out by the networks 180 and 182 are multiplied together in a multiplier 184 and are then added to a component of the original, incoming preemphasis component in an adder circuit 186. The effect of the gamma pre-correction circuit 98 upon the incoming preemphasis component is illustrated for both low transition levels (left side) and high transition levels (right side) in the waveforms graphed in FIG. 17D. Essentially, the gamma precorrection comprises inclusion into the preemphasis component of a predetermined small percentage of the second harmonic thereof. The circuit 98 is primarily included within the FIG. 5 IF modulator circuit as a further way to enhance compatibility with preexisting television displays.

Reception System 14

Figure 18:
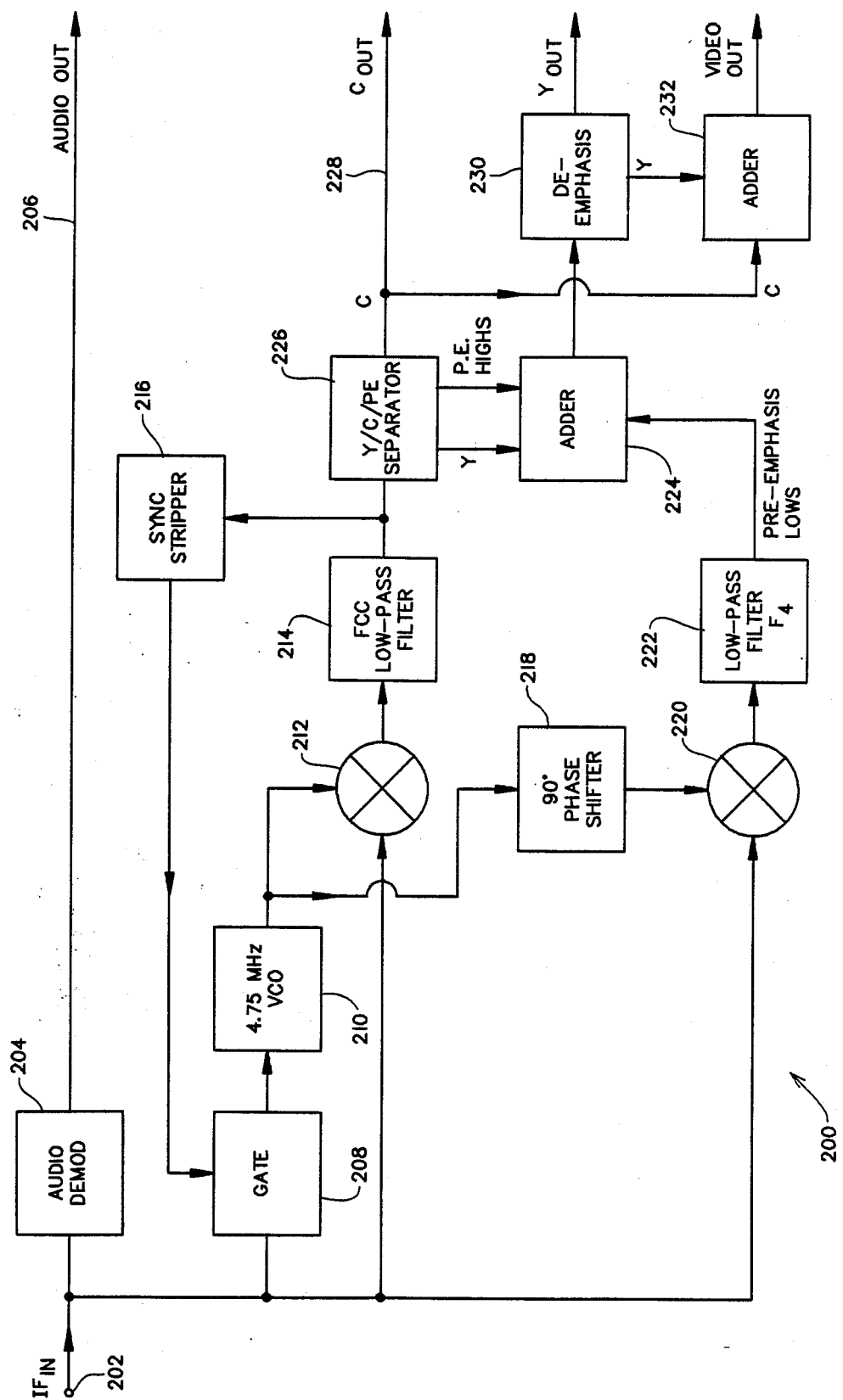
FIG. 18 is a block diagram of a receiver demodulator for demodulating and effectively utilizing the signal generated by the FIG. 5 IF modulator system.

A receiver demodulator 200 is depicted in FIG. 18. The IF signal derived from the path 16 is first subjected to audio demodulation in a conventional audio demodulator circuit 204 and put out on a line 206. The IF signal is also passed through a gate circuit 208 in order to control the frequency of a very stable crystal oscillator based 45.75 MHz voltage controlled carrier reinsertion oscillator 210 which supplies IF carrier to a modulator 212. Main path video (luminance and chroma) are demodulated in a conventional demodulator circuit 212 and subjected to low pass filtering in a filter 214. A sync stripper circuit 216 generates a gating control signal which feeds back to control the gate circuit 208. The phase of the incoming carrier signal is sampled during the synchronization period and used as a phase reference to which the locally generated IF carrier is phase locked.

The locally generated carrier signal is also subjected to a 90 degree phase shift process in a phase shifter circuit 218 which is used to quadrature demodulate the suppressed carrier double sideband preemphasis component of the incoming IF signal by a synchronous four quadrant multiplier/demodulator 220. A low pass filter 222 having the F4 filter characteristic of FIG. 10 passes the low frequency portion of the preemphasis component to an adder circuit 224. At the same time the low pass filtered main path video enters a luminance/chrominance/preemphasis component separation circuit 226 which effectively separates luminance, chrominance and the high frequency preemphasis component by comb filter processing. Chrominance is put out on a line 228. The adder circuit 224 combines the preemphasis low frequency component and the preemphasis high frequency component and the luminance and puts out the resultant, which comprises a preemphasized video luminance signal to e.g. a tridimensional deemphasis circuit 230 (since the received signal was preemphasized in three dimensions at the transmission end) which separately deemphasizes the signal in the three dimensions and ultimately puts out deemphasized luminance in which noise and other artifacts added by the transmission path 16 have been significantly reduced. An adder circuit 232 combines combed luminance and combed chrominance into a color composite output signal.

Figure 19:
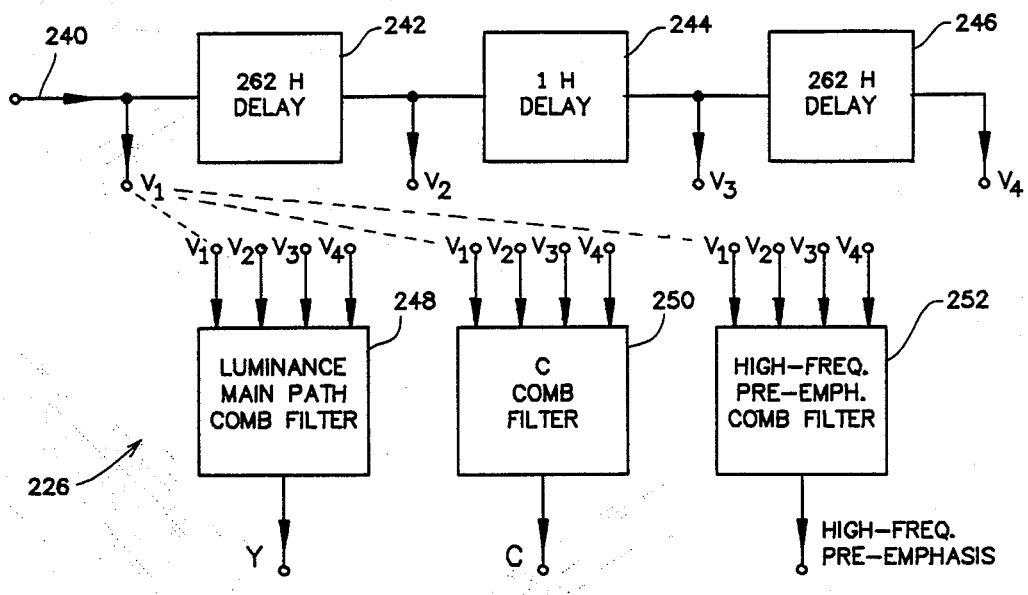
FIG. 19 is a block diagram of a luminance/chrominance preemphasis separator circuit element of the FIG. 18 receiver demodulator system.
Figure 21:
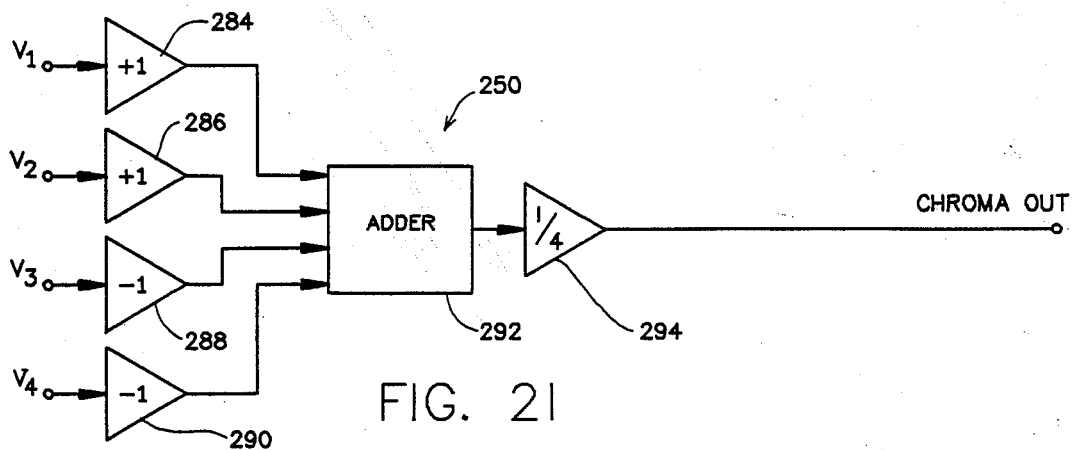
FIG. 21 is a block diagram of the chrominance main path comb filter circuit element depicted in FIG. 19.
Figure 22:
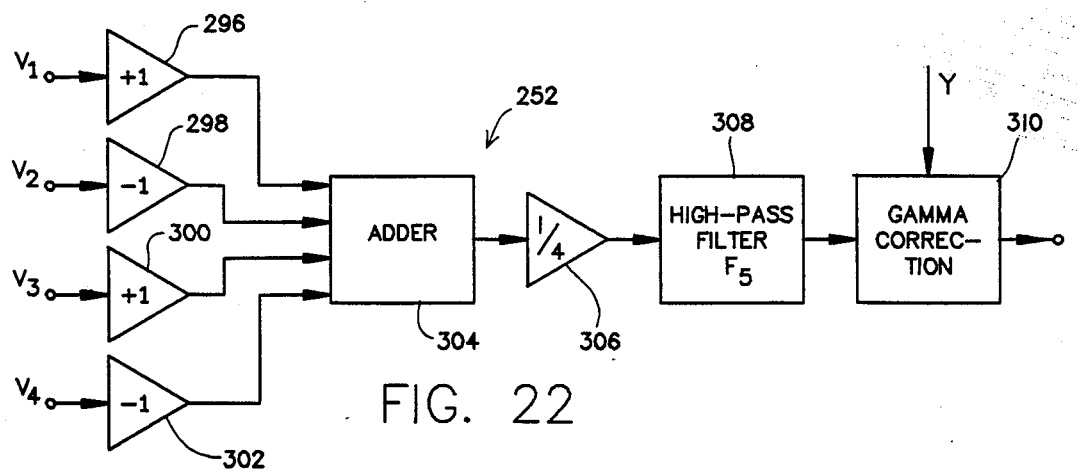
FIG. 22 is a block diagram of the high-frequencies preemphasis comb filter circuit element depicted in FIG. 19.

FIG. 19 illustrates the three comb filters established within the separator circuit 226 of the FIG. 18 receiver demodulator 200. The signal from the filter 214 enters a delay line on a line 240 and passes through a first field delay 242, a one-line delay 244 and a second field delay 246. V1, V2, V3 and V4 delay components are then available for connection to a luminance main path comb filter 248 which puts out combed luminance, a chrominance main path comb filter 250 which puts out combed chrominance, and a high frequency preemphasis component comb filter 252 which puts out the high frequency portion of the preemphasis component.

Figure 20:
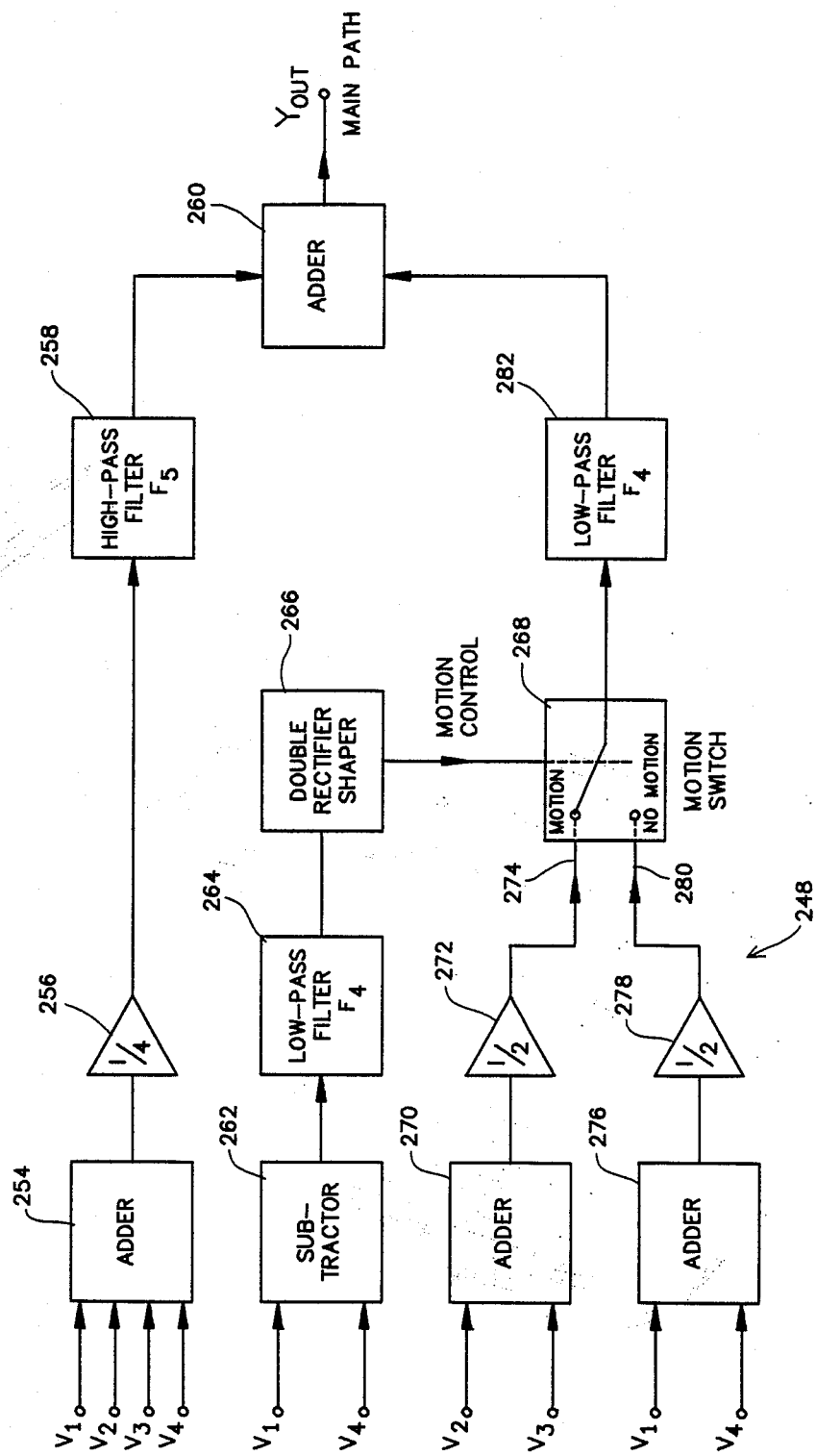
FIG. 20 is a block diagram of the luminance main path comb filter circuit element depicted in FIG. 19.

The luminance main path comb filter 248 is illustrated structurally in FIG. 20. Therein an adder 254 combines the V1, V2, V3 and V4 components and an amplifier 256 divides the sum by four. A high pass filter 258 having the F5 characteristic provides a signal presented to an adder 260. V1 is subtracted from V4 in a subtractor 262 and the difference is low pass filtered by passage through a filter 264 having the F4 characteristic. The filtered signal is then double rectified and shaped in a circuit 266 in order to provide a motion control signal for controlling a motion control switch 268.

The V2 and V3 components are added in an adder 270 and the sum then halved in amplitude by an amplifier 272 to provide a combing signal component in the presence of motion. The V1 and V4 signals are added in an adder circuit 276 and the sum then halved in amplitude by an amplifier 278 to provide a combing signal component when there is no motion. The output from the switch 268 is low pass filtered by passage through a low pass filter 282 having the F4 characteristic and the resultant is then combined with the high pass filtered resultant put out by the filter 258 in an adder circuit 260.

The chroma comb filter 250 is simpler. Two unity gain amplifiers 284, 286, respectively receive the V1 and V2 components. Two unity gain inverters 288 and 290 respectively receive the V3 and V4 components. These signals are combined in an adder 292 wherein the luminance components (and preemphasis components) are cancelled, whereas chroma is passed. A quarter amplitude gain amplifier 294 restores the combed chroma to its proper level and it is then put out.

The high frequency preemphasis component comb filter 252 includes four amplifiers 296, 298, 300, and 302 respectively connected to the V1, V2, V3, and V4 components. Amplifiers 298 and 302 are inverters. A one quarter gain amplifier 306 restores proper level to the combed preemphasis component and it then passes through a high pass filter 308 having the F5 characteristic. The resultant high pass filtered high frequency preemphasis component is subjected to gamma correction in a corrector circuit 310 and is then put out.

Figure 23A:
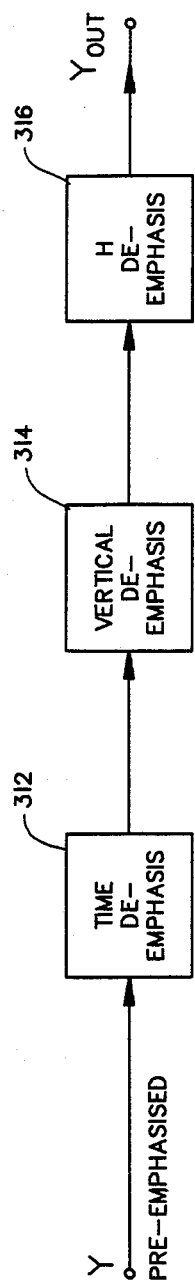
FIG. 23A is a block diagram of a tandem-connected de-emphasis circuit for use within the FIG. 18 receiver demodulator system showing time domain deemphasis, vertical deemphasis and horizontal deemphasis circuit elements connected respectively in tandem.
Figure 23B:
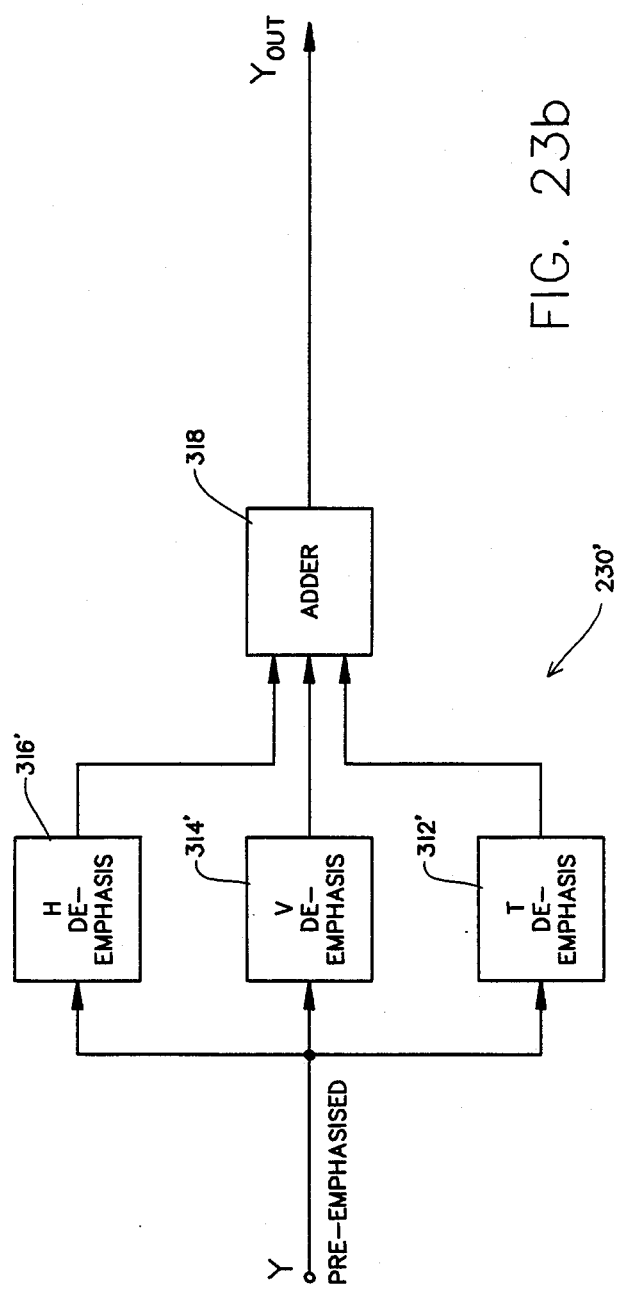
FIG. 23B is a block diagram of a parallel-connected deemphasis circuit for use within the FIG. 18 receiver demodulator system showing horizontal, vertical and time domain deemphasis circuit elements connected in a parallel configuration.

The deemphasis circuit 230 may have a series configuration as shown in FIG. 23A, or it may have a parallel arrangement as shown in FIG. 23B. In the series circuit a time domain deemphasis circuit 312 is followed by a vertical deemphasis circuit 314 and then by a horizontal deemphasis circuit 316. In the parallel circuit 230' the outputs from the time domain circuit 312', vertical circuit 314' and horizontal circuit 316' are combined together in an adder circuit 318 and then put out.

Figure 24:
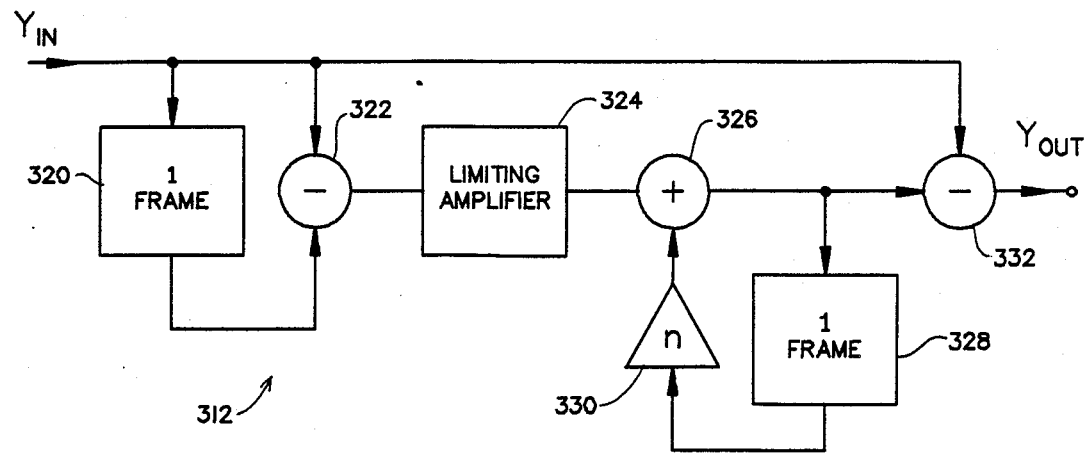
FIG. 24 is a block diagram of the time domain deemphasis circuit illustrated in FIGS. 23A and 23B.
Figure 25:
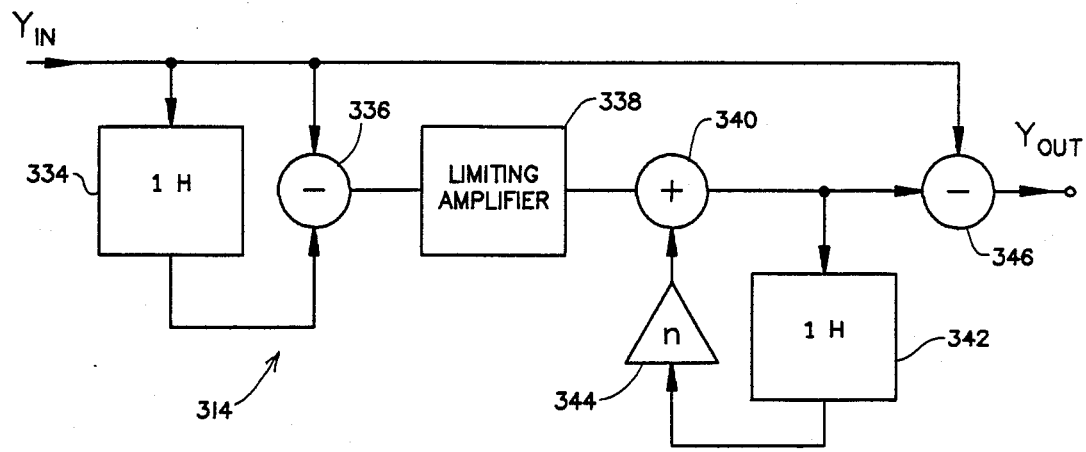
FIG. 25 is a block diagram of the vertical deemphasis circuit illustrated in FIGS. 23A and 23B.
Figure 26:
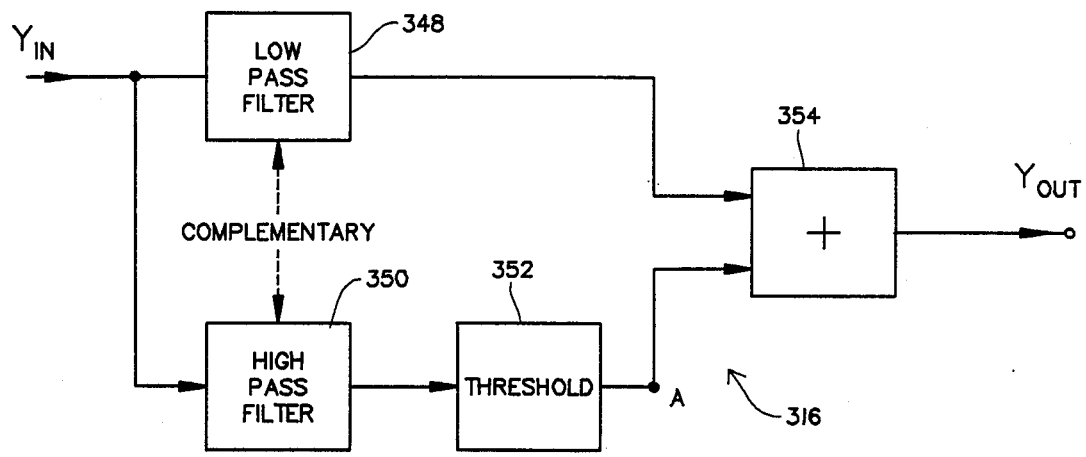
FIG. 26 is a block diagram of the horizontal deemphasis circuit illustrated in FIGS. 23A and 23B.

FIG. 24 shows the time domain deemphasis circuit 312 as including a frame delay 320 and subtractor 322, followed by a limiting amplifier 324 to eliminate deemphasis of large transition amplitude signals and recirculation circuit including a summing junction 326, frame delay 328 and fractional gain n recirculation amplifier 330. The resultant signal which spreads a time domain event over successive frames is subtracted from the main path luminance in the subtractor circuit 332 to provide output luminance in which noise and other artifacts associated with the time domain have been reduced in accordance with the present invention.

The vertical domain deemphasis circuit 314 includes a one line delay 334 and a subtractor 336, followed by a limiting amplifier 338 to eliminate deemphasis of large transition amplitude signals, and a recirculation circuit including a summing junction 340, line delay 342 and fractional gain n recirculation amplifier 344 which spreads a vertical domain event over several lines. The recirculation component is then subtracted from the main path luminance to provide output luminance in which noise and other artifacts associated with the vertical domain have been reduced in accordance with the present invention.

The horizontal domain deemphasis circuit comprises two complementary filters, a low pass filter 348 and a high pass filter 350. A threshold circuit 352 follows the high pass circuit to eliminate deemphasis processing for signals above a certain amplitude. The filtered signals are then recombined into a single horizontal domain luminance spectrum in an adder circuit 354 and put out as luminance in which noise and other artifacts associated with the horizontal domain have been reduced in accordance with the present invention.

While the method and apparatus of the present invention have een summarized and explained by an illustrative application in compatible television transmission systems with a separate preemphasis path within a single channel, it will be readily apparent to those skilled in the art that many widely varying embodiments and applications are within the teaching and scope of the present invention, and that the examples herein are by way of illustration only and should not be construed as limiting the scope of this invention.

I claim:

1. A method for reducing noise and interference artifacts in a television video signal for passage through a degrading medium comprising the steps of:
    at a transmission end, dividing the television signal into two paths, a main path and a preemphasis path,
    developing a main path television signal in the main path,
    deriving a preemphasis component from the television signal in the preemphasis path in accordance with at least one predetermined preemphasis criterion,
    multiplexing the preemphasis component from the preemphasis path into a single spectrum including the main path television signal, the single spectrum having a bandwidth substantially no greater than that required by the main path television signal without substantial intermixture of the preemphasis component and the main path television signal, and
    passing the single spectrum through the degrading medium.

2. The method set forth in claim 1 comprising the further steps of:
    receiving the single spectrum from the degrading medium at a reception end,
    separating the preemphasis component from the main path television signal to provide a received main path television signal and a received preemphasis component,
    combining the received preemphasis component and the received main path television signal into a single received composite signal, and
    deemphasizing and putting out for display said received composite signal in accordance with an inverse of said at least one preemphasis criterion.

3. The method set forth in claim 1 wherein said step of multiplexing the preemphasis component from the preemphasis path into a single spectrum comprises the step of double sideband suppressed carrier modulating the preemphasis component in quadrature with the picture carrier modulation.

4. The method set forth in claim 1 wherein said step of multiplexing the preemphasis component from the preemphasis path into a single spectrum comprises the step of inverting on a scan period basis the preemphasis component and thereupon inserting the scan-period-inverting preemphasis component into the single spectrum, thereby enabling separation of the preemphasis component at the receiving end by comb filter separation.

5. The method set forth in claim 4 wherein said inverting step comprises the step of inverting the preemphasis component on a field-by-field basis.

6. The method set forth in claim 1 wherein said step of multiplexing the preemphasis component from the preemphasis path into a single spectrum, comprises the steps of creating a low frequency preemphasis segment multiplexed with low frequency double sideband luminance energy groups of said single spectrum by double sideband suppressed carrier modulation about the picture carrier and creating a high frequency preemphasis segment interleaved between mid frequency single sideband luminance energy groups by periodic segment inversion relative to the scanning rate of the television signal.

7. The method set forth in claim 6 wherein the step of creating a high frequency preemphasis segment by periodic segment inversion relative to the scanning rate of the television signal comprises the step of inverting the high frequency preemphasis segment on a field-by-field basis.

8. The method set forth in claim 6 wherein the step of creating a low frequency preemphasis segment multiplexed with low frequency double sideband luminance energy groups of said single spectrum by double sideband suppressed carrier modulation about the picture carrier comprises the steps of:
    generating a low frequency preemphasis segment modulation carrier which phase shifts plus and minus ninety degrees relative to the phase of the picture carrier, and
    double sideband modulating the low frequency preemphasis segment by the modulation carrier in a four quadrant multiplier so that the modulation carrier is cancelled and thereby suppressed.

9. The method set forth in claim 1 wherein the step of deriving a preemphasis component from the television signal in the preemphasis path includes the steps of:
deriving a preemphasis component in at least of one of the horizontal, vertical and temporal scan domains of the television signal,
low pass filtering the derived preemphasis component to limit its bandwidth to be no greater than the bandwidth of the main path television signal,
dividing the preemphasis component into two complementary segments, a high frequency segment and a low frequency segment,
inverting on a field by field basis the high frequency segment of the preemphasis component,
comb filter processing of the high frequency segment of the preemphasis component in order to eliminate any residual main path luminance and chrominance components in the preemphasis component, and
combining the low frequency segment and the high frequency segment in an adder circuit.

10. The method set forth in claim 9 further comprising the step of gamma correcting the high frequency segment of the preemphasis component prior to its addition to the low frequency segment in accordance with a predetermined gamma correction criterion in order to reduce grey-level shift and flicker artifacts on a prior art television receiver picture display with which the television signal is otherwise compatible.

11. The method set forth in claim 1 wherein the step of deriving a preemphasis component from the television signal in the preemphasis path accordance with at least one predetermined preemphasis criterion comprises the steps of
creating a preemphasis component in the horizontal domain,
creating a preemphasis component in the vertical domain,
creating a preemphasis component in the temporal domain, and
combining the three said preemphasis components into a single derived preemphasis component.

12. The method set forth in claim 1 wherein the step of deriving a preemphasis component from the television signal in the preemphasis path in accordance with at least one predetermined preemphasis criterion comprises the step of deriving the preemphasis component by a factor which varies in accordance with luminance transition absolute magnitude.

13. The method set forth in claim 12 wherein the factor employed in the step of deriving the preemphasis component has a maximum magnitude at approximately 20 IRE units and has minimum magnitudes at zero IRE units and above approximately 60 IRE units.

14. The method set forth in claim 1 wherein the step of developing a main path television signal in the main path comprises the step of precombing the television signal in order to provide spectral space for interleave of the preemphasis component without significant spectral overlap with at least one of luminance and chroma components of the television signal, thereby minimizing the appearance of preemphasis interference artifacts in the resultant picture display.

15. The method set forth in claim 1 wherein the television signal is a quadrature modulated color subcarrier television signal in accordance with the NTSC signal format.

16. A method of receiving a television video signal from a degrading medium in which noise and other degradation events have been added to the television signal and processing the signal for visual display, and wherein the television signal includes a preemphasis component derived according to predetermined preemphasis criteria multiplexed with a main path television signal component including luminance information in a single spectrum, the receiving method comprising the steps of:
separating the main path television signal component and the preemphasis component,
combining the main path television signal component and the preemphasis component into a single television reception signal,
deemphasizing the single television reception signal in accordance with an inverse of the predetermined preemphasis criteria, and putting out said deemphasized single television reception signal for display.

17. The method set forth in claim 16 wherein the step of separating the main path television signal component and the preemphasis component comprises the steps of separating luminance and chrominance components of the main path television signal and a high frequency segment of the preemphasis component multiplexed therewith by comb filter signal processing and separating a low frequency preemphasis segment of the preemphasis component by synchronous demodulation with reference to a carrier in quadrature phase relation to a main picture carrier of the said spectrum.

18. A method for reducing noise and interference artifacts in a television system including a transmission end for transmitting a quadrature modulated color subcarrier television video signal through a degrading medium and for display at a reception end, the method comprising the steps of:
at the transmission end, dividing the television signal into two paths, a main path and a preemphasis path,
developing a main path television signal component in the main path,
deriving a preemphasis component from the television signal in the preemphasis path in accordance with at least one predetermined preemphasis criterion,
multiplexing the preemphasis component from the preemphasis path into a single spectrum including the main path television signal component, the single spectrum having a bandwidth substantially no greater than that required by the main path television signal without substantial intermixture of the preemphasis component and the main path television signal
passing the single spectrum through the degrading medium;
at the reception end, separating the single spectrum into received main path television signal component and a received preemphasis component,
combining the received main path television signal component and the received preemphasis component into a single television reception signal, and
deemphasizing the single television reception signal in accordance with an inverse of said predetermined preemphasis criterion, and putting out said deemphasized single television reception signal for display.

19. The method set forth in claim 18 wherein the step of multiplexing the preemphasis component from the preemphasis path into a single spectrum comprises the steps of creating a low frequency preemphasis segment multiplexed with low frequency double sideband luminance energy groups of said single spectrum by double sideband suppressed carrier modulation about the picture carrier and creating a high frequency preemphasis segment interleaved between mid frequency single sideband luminance energy groups by periodic segment inversion relative to the scanning rate of the television signal; and wherein the reception end step of separating the single spectrum into a received main path television signal component and a received preemphasis component comprises the steps of separating luminance and chrominance components of the main path television signal and a high frequency segment of the preemphasis component multiplexed therewith by comb filter signal processing and separating a low frequency preemphasis segment of the preemphasis component by synchronous demodulation with reference to a carrier in quadrature phase relation to the main picture carrier of the spectrum.

20. The method set forth in claim 19 wherein the reception end step of separating luminance and chrominance components of the main path television signal from the premphasis component comprises the steps of:
    passing the received single spectrum through a plurality of predetermined delays relating to scan periods of the television signal to develop delay components, and
    separately passing the delay components through a luminance comb filter structure to extract the luminance component, a chrominance comb filter structure to extract the chrominance component, and a preemphasis comb filter structure to extract the high frequency preemphasis segment.

21. The method set forth in claim 20 wherein the transmission end step of deriving a preemphasis component from the television signal in the preemphasis path in accordance with at least one predetermined preemphasis criterion includes the steps of:
    deriving a preemphasis component in at least one of the horizontal, vertical and temporal scan domains of the television signal,
    low pass filtering the derived preemphasis component to limit its bandwidth to be no greater than the bandwidth of the main path television signal,
    dividing the preemphasis component into two complementary segments, a high frequency segment and a low frequency segment,
    inverting on a field by field basis the high frequency segment of the preemphasis component,
    comb filter processing the high frequency segment of the preemphasis component in order to eliminate any residual main path luminance and chrominance components in the preemphasis component, and
    combining the low frequency segment and the high frequency segment in an adder circuit; and,
    wherein the step at the reception end of passing the received single spectrum through a plurality of predetermined relays relating to scan periods of the television signal to develop delay components comprises passing the single spectrum through a first field period delay, a line period delay and a second field period delay arranged in series.

22. The method as set forth in claim 18 wherein the transmission end step of deriving a preemphasis component from the television signal in the preemphasis path in accordance with at least one predetermined preemphasis criterion comprises the step of
    creating a first preemphasis component in the horizontal domain,
    creating a second preemphasis component in the vertical domain,
    creating a third preemphasis component in the temporal domain,
    combining the first, second, and third preemphasis components into a single derived preemphasis component; and
    wherein the reception end step of deemphasizing the single television reception signal in accordance with an inverse of said predetermined preemphasis criterion comprises the separate steps of:
    deemphasizing the first preemphasis component in the horizontal domain,
    deemphasizing the second preemphasis component in the vertical domain, and
    deemphasizing the third preemphasis component in the temporal domain.

* * * * *